(12) United States Patent
Taki

(10) Patent No.: US 7,392,393 B2
(45) Date of Patent: Jun. 24, 2008

(54) CONTENT DISTRIBUTION SYSTEM

(75) Inventor: Ryuta Taki, Kanagawa (JP)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 10/469,703

(22) PCT Filed: Jan. 9, 2003

(86) PCT No.: PCT/JP03/00107

§ 371 (c)(1),
(2), (4) Date: Sep. 12, 2003

(87) PCT Pub. No.: WO03/061189

PCT Pub. Date: Jul. 24, 2003

(65) Prior Publication Data

US 2004/0098592 A1 May 20, 2004

(30) Foreign Application Priority Data

Jan. 16, 2002 (JP) .................................. 2002-7656

(51) Int. Cl.
*H04L 9/00* (2006.01)
*G06F 7/04* (2006.01)

(52) U.S. Cl. ..................... 713/176; 713/155; 713/159; 713/176; 726/10

(58) Field of Classification Search ................. 713/176, 713/159; 176/155; 726/10
See application file for complete search history.

(56) References Cited

U.S. PATENT DOCUMENTS

| | | | | |
|---|---|---|---|---|
| 5,919,247 A | * | 7/1999 | Van Hoff et al. ............ | 709/217 |
| 6,189,146 B1 | * | 2/2001 | Misra et al. ................ | 717/177 |
| 6,385,596 B1 | * | 5/2002 | Wiser et al. ................... | 705/51 |
| 6,397,261 B1 | * | 5/2002 | Eldridge et al. ............. | 713/171 |
| 6,493,760 B1 | * | 12/2002 | Pendlebury et al. ......... | 709/229 |
| 6,799,271 B2 | * | 9/2004 | Kugai .......................... | 713/168 |
| 6,839,677 B2 | * | 1/2005 | Mathur et al. ................... | 705/1 |
| 6,898,636 B1 | * | 5/2005 | Adams et al. ............... | 709/229 |
| 7,003,799 B2 | * | 2/2006 | Jorgenson .................... | 726/12 |
| 2002/0035540 A1 | * | 3/2002 | Yamaguchi ................... | 705/39 |
| 2002/0087858 A1 | * | 7/2002 | Oliver et al. ................. | 713/156 |

FOREIGN PATENT DOCUMENTS

| | | |
|---|---|---|
| JP | 8-335208 | 12/1996 |
| JP | 11-174956 | 7/1999 |
| JP | 2001-095158 | 4/2001 |
| JP | 2001-285766 | 10/2001 |
| JP | 2001-290912 | 10/2001 |
| JP | 2002-189908 | 7/2002 |
| WO | 01/03410 | 1/2001 |

* cited by examiner

*Primary Examiner*—Nasser Moazzami
*Assistant Examiner*—Mohammad Reza
(74) *Attorney, Agent, or Firm*—Oblon, Spivak, McClelland, Maier & Neustadt, P.C.

(57) ABSTRACT

A system that allows secure processing in a case where a download-requesting terminal and a download-destination terminal are different devices is implemented. A content distribution server receives a ticket carrying a signature of a download destination from a terminal requesting downloading of content, and verifies the ticket to verify that a device serving as the download destination is a device authorized by the download-requesting terminal, thereby verifying the authenticity of the device serving as the download destination without directly authenticating the device serving as the download destination. Furthermore, a content-signing key [Ksig] or a hash value is exchanged as data that can be cryptographically processed only at the download-requesting device and the download-destination device, so that, for example, checking of the integrity of the content is allowed only at a legitimate download-destination device.

21 Claims, 20 Drawing Sheets

CONTENT DISTRIBUTION SYSTEM

TECHNICAL FIELD

The present invention relates to content distribution systems, content distribution methods, information processing apparatuses, and computer programs. Particularly, the present invention relates to a content distribution system, a content distribution method, an information processing apparatus, and a computer program with which content can be securely transmitted and downloaded to a user device and with which convenience is improved.

BACKGROUND ART

Recently, a form of content utilization using a mobile device is becoming common, in which various software data, such as image data, audio data, and game programs (hereinafter referred to as content), is distributed from a data distribution server via a network such as the Internet to a user device, for example, a PC, or a mobile device such as a mobile computer, a PDA, or a cellular phone, the data being stored in a storage medium of the device.

An information device such as a PC or a mobile terminal has an interface for receiving content from a network, and it also includes control means that is needed to play back content, and a RAM and a ROM that are used as memories for storing programs and data.

Various content such as music data, video data, or programs is stored in a storage medium in a storage medium of a user device, such as a hard disk or a flash memory, via, for example, the Internet. The content is retrieved from the storage medium according to a user's instruction to an information device that is used as a content-playback device, such as a PC or a mobile terminal, and is played back by a main unit of the information device or by a display or a speaker that is connected.

When content is distributed, that is, when content is downloaded from a content distribution server to a user device, usually, an authentication process of various types as to whether the user device is a legitimate device that is allowed to access content is executed, for example, based on a public-key cryptosystem or a shared-key cryptosystem, thereby verifying the authenticity of the user device.

In accordance with the recent spread of various information processing terminals, use of a plurality of information devices by an individual user has become common; for example, an individual user has a PC at home, and uses a mobile device outside such as a cellular phone, a mobile computer, or a PDA. It has become possible to issue requests for downloading various content from the various devices to content distribution servers.

When content is downloaded on condition of authentication, for example, when a user using a mobile terminal outside issues to a content distribution server a request for content distribution, authentication is executed between the mobile terminal the user is using and the server, and content is sent when the mobile terminal is a legitimate device. When the user using a PC at home issues to the content distribution server a request for content distribution, authentication is executed between the PC the user is using and the server, and content is sent and downloaded if the PC is a legitimate device. That is, the content distribution server permits downloading of content by executing authentication with a device that serves as a content-download destination.

Types of content to be downloaded have become diverse, and content available for downloading includes small-volume content that can be stored in a small memory of a cellular phone or the like, such as music content or a game program, and large-volume content that can be stored in a hard disk of a PC or the like but cannot be stored in a small memory of a cellular phone or the like, such as moving-picture content of a movie or the like.

If a user using a mobile terminal having a relatively small memory, such as a flash memory, issues a request to a content distribution server for downloading large-volume content such as a movie, the content cannot be stored in the memory of the mobile terminal, so that the user inevitably has to give up downloading the content.

DISCLOSURE OF INVENTION

The present invention has been made in view of the problem described above, and an object thereof is to provide a content distribution system, a content distribution method, an information processing apparatus, and a program with which a user having a plurality of information processing apparatuses capable of receiving data, such as a PC and a mobile terminal, is allowed to access a content distribution server using one of the apparatuses, e.g., the mobile terminal, and to receive and download content securely from the content distribution server to another apparatus of the user, for example, the PC.

The present invention, in a first aspect thereof, provides a content distribution system comprising:

a first information processing apparatus for issuing a content-download request in which a download destination that is different from the first information processing apparatus itself is specified;

a second information processing apparatus that is specified as a download destination of content; and a content distribution server for receiving the content-download request from the first information processing apparatus and sending the content to the second information processing apparatus;

wherein the first information processing apparatus sends a ticket carrying a digital signature of the second information processing apparatus to the content distribution server, and wherein the content distribution server verifies the digital signature on the ticket, and on condition that the verification has succeeded, the content distribution server determines that the second information processing apparatus is a content-download destination authorized by the first information processing apparatus, and sends the content to the second information processing apparatus.

Furthermore, in an embodiment of the content distribution system according to the present invention, the first information processing apparatus and the second information processing apparatus have a homenet-area shared secret key [Ksec] that serves as a shared secret key, the first information processing apparatus sends encrypted key data [E(Ksec, Ksig)] to the second information processing apparatus via the content distribution server, the encrypted key data [E(Ksec, Ksig)] being obtained by encrypting, using the homenet-area shared secret key [Ksec], a content-signing key [Ksig] generated by the content distribution server, and the second information processing apparatus verifies a signature on the content received from the content distribution server, using the content-signing key [Ksig] obtained by decrypting the encrypted key data [E(Ksec, Ksig)] using the homenet-area shared secret key [Ksec].

Furthermore, in an embodiment of the content distribution system according to the present invention, the first information processing apparatus and the second information processing apparatus have a homenet-area shared secret key [Ksec] that serves as a shared secret key, the first information processing apparatus sends an encrypted hash value [E(Ksec, H(M))] to the second information processing apparatus via the content distribution server, the encrypted hash value [E(Ksec, H(M))] being obtained by encrypting, using the homenet-area shared secret key [Ksec], a hash value [H(M)] of the content, generated by the content distribution server, and the second information processing apparatus verifies the content received from the content distribution server, using the hash value [H(M)] of the content, obtained by decrypting the encrypted hash value [E(Ksec, H(M))] using the homenet-area shared secret key [Ksec].

Furthermore, in an embodiment of the content distribution system according to the present invention, each of the first information processing apparatus and the second information processing apparatus has a public key and a secret key of a public-key cryptosystem, the first information processing apparatus sends encrypted key data [E(K_SEC_MBL, Ksig)] to the second information processing apparatus via the content distribution server, the encrypted key data [E(K_SEC_MBL, Ksig)] being obtained by encrypting, using the secret key [K_SEC_MBL] of the first information processing apparatus, a content-signing key [Ksig] generated by the content distribution server, and the second information processing apparatus verifies a signature on the content received from the content distribution server, using the content-signing key [Ksig] obtained by decrypting the encrypted key data [E(K_SEC_MBL, Ksig)] using the public key [K_PUB_MBL] of the first information processing apparatus.

Furthermore, in an embodiment of the content distribution system according to the present invention, each of the first information processing apparatus and the second information processing apparatus has a public key and a secret key of a public-key cryptosystem, the first information processing apparatus sends an encrypted hash value [E(K_SEC_MBL, H(M))] to the second information processing apparatus via the content distribution server, the encrypted hash value [E(K_SEC_MBL, H(M))] being obtained by encrypting, using the secret key [K_SEC_MBL] of the first information processing apparatus, a hash value [H(M)] of the content, generated by the content distribution server, and the second information processing apparatus verifies a signature on the content received from the content distribution server, using the hash value [H(M)] of the content, obtained by decrypting the encrypted hash value [E(K_SEC_MBL, H(M))] using the public key [K_PUB_MBL] of the first information processing apparatus.

Furthermore, in an embodiment of the content distribution system according to the present invention, the ticket is obtained by applying a digital signature on data including respective identifiers (IDs) of the first information processing apparatus and the second information processing apparatus, using a secret key of the second information processing apparatus, and the content distribution server verifies the digital signature on the ticket using a public key of the second information processing apparatus.

Furthermore, in an embodiment of the content distribution system according to the present invention, the content distribution server verifies the digital signature on the ticket by (a) verifying the validity of a public-key certificate of the second information processing apparatus by verifying a signature on the public-key certificate (a signature of a certificate authority); (b) obtaining a public key of the second information processing apparatus from the public-key certificate whose validity has been verified; and (c) verifying the signature on the ticket of the second information processing apparatus using the public key of the second information processing apparatus.

The present invention, in a second aspect thereof, provides a content distribution method for a content distribution system including a first information processing apparatus for issuing a content-download request in which a download destination that is different from the first information processing apparatus itself is specified; a second information processing apparatus that is specified as a download destination of content; and a content distribution server for receiving the content-download request from the first information processing apparatus and sending the content to the second information processing apparatus; the content distribution method comprising:

at the first information processing apparatus, a step of sending a ticket carrying a digital signature of the second information processing apparatus to the content distribution server;

and at the content distribution server, a step of verifying the digital signature on the ticket; and a step of determining, on condition that the verification has succeeded, that the second information processing apparatus is a content-download destination authorized by the first information processing apparatus, and sending the content to the second information processing apparatus.

Furthermore, in an embodiment of the content distribution method according to the present invention, in the content distribution method, the first information processing apparatus sends encrypted key data [E(Ksec, Ksig)] to the second information processing apparatus via the content distribution server, the encrypted key data [E(Ksec, Ksig)] being obtained by encrypting, using a homenet-area shared secret key [Ksec] that serves as a secret key shared by the first information processing apparatus and the second information processing apparatus, a content-signing key [Ksig] generated by the content distribution server, and the second information processing apparatus verifies a signature on the content received from the content distribution server, using the content-signing key [Ksig] obtained by decrypting the encrypted key data [E(Ksec, Ksig)] using the homenet-area shared secret key [Ksec].

Furthermore, in an embodiment of the content distribution method according to the present invention, in the content distribution method, the first information processing apparatus sends an encrypted hash value [E(Ksec, H(M))] to the second information processing apparatus via the content distribution server, the encrypted hash value [E(Ksec, H(M))] being obtained by encrypting, using a homenet-area shared secret key [Ksec] that serves as a secret key shared by the first information processing apparatus and the second information processing apparatus, a hash value [H(M)] of the content, generated by the content distribution server, and the second information processing apparatus verifies the content received from the content distribution server, using the hash value [H(M)] of the content, obtained by decrypting the encrypted hash value [E(Ksec, H(M))] using the homenet-area shared secret key [Ksec].

Furthermore, in an embodiment of the content distribution method according to the present invention, in the content distribution method, the first information processing apparatus sends encrypted key data [E(K_SEC_MBL, Ksig)] to the second information processing apparatus via the content distribution server, the encrypted key data [E(K_SEC_MBL, Ksig)] being obtained by encrypting, using a secret key [K_SEC_MBL] of the first information processing apparatus, a content-signing key [Ksig] generated by the content distribution server, and the second information processing apparatus verifies a signature on the content received from the content distribution server, using the content-signing key [Ksig] obtained by decrypting the encrypted key data [E(K_SEC_MBL, Ksig)] using a public key [K_PUB_MBL] of the first information processing apparatus.

Furthermore, in an embodiment of the content distribution method according to the present invention, in the content distribution method, the first information processing apparatus sends an encrypted hash value [E(K_SEC_MBL, H(M))] to the second information processing apparatus via the content distribution server, the encrypted hash value [E(K_SEC_MBL, H(M))] being obtained by encrypting, using a secret key [K_SEC_MBL] of the first information processing apparatus, a hash value [H(M)] of the content, generated by the content distribution server, and the second information processing apparatus verifies the content received from the content distribution server, using the hash value [H(M)] of the content, obtained by decrypting the encrypted hash value [E(K_SEC_MBL, H(M))] using a public key [K_PUB_MBL] of the first information processing apparatus.

Furthermore, in an embodiment of the content distribution method according to the present invention, the ticket is obtained by applying a digital signature on data including respective identifiers (IDs) of the first information processing apparatus and the second information processing apparatus, using a secret key of the second information processing apparatus, and the content distribution server verifies the digital signature on the ticket using a public key of the second information processing apparatus.

Furthermore, in an embodiment of the content distribution method according to the present invention, the content distribution server verifies the digital signature on the ticket by (a) verifying the validity of a public-key certificate of the second information processing apparatus by verifying a signature on the public-key certificate (a signature of a certificate authority); (b) obtaining a public key of the second information processing apparatus from the public-key certificate whose validity has been verified; and (c) verifying the signature on the ticket of the second information processing apparatus using the public key of the second information processing apparatus.

The present invention, in a third aspect thereof, provides an information processing apparatus for issuing a download request in which a download destination that is different from the information processing apparatus itself is specified, the information processing apparatus comprising:

storage means that stores a ticket carrying a digital signature of a second information processing apparatus that serves as a download destination of content;

control means for generating a content-download-request command including the ticket stored in the storage means; and communication means for sending the content-download-request command including the ticket to a content distribution server.

Furthermore, in an embodiment of the information processing apparatus, the control means of the information processing apparatus generates encrypted key data [E(Ksec, Ksig)] as data to be transmitted to the second information processing apparatus, the encrypted key data [E(Ksec, Ksig)] being obtained by encrypting, using a homenet-area shared secret key [Ksec] that serves as a secret key shared by the information processing apparatus and the second information processing apparatus, a content-signing key [Ksig] generated by the content distribution server.

Furthermore, in an embodiment of the information processing apparatus, the control means of the information processing apparatus generates an encrypted hash value [E(Ksec, H(M))] as data to be transmitted to the second information processing apparatus, the encrypted hash value [E(Ksec, H(M))] being obtained by encrypting, using a homenet-area shared secret key [Ksec] that serves as a secret key shared by the information processing apparatus and the second information processing apparatus, a hash value [H(M)] of the content, generated by the content distribution server.

Furthermore, in an embodiment of the information processing apparatus, the control means of the information processing apparatus generates encrypted key data [E(K_SEC_MBL, Ksig)] as data to be transmitted to the second information processing apparatus, the encrypted key data [E(K_SEC_MBL, Ksig)] being obtained by encrypting, using a secret key [K_SEC_MBL] of the information processing apparatus, a content-signing key [Ksig] generated by the content distribution server.

Furthermore, in an embodiment of the information processing apparatus, the control means of the information processing apparatus generates an encrypted hash value [E(K_SEC_MBL, H(M))] as data to be transmitted to the second information processing apparatus, the encrypted hash value [E(K_SEC_MBL, H(M))] being obtained by encrypting, using a secret key [K_SEC_MBL] of the information processing apparatus, a hash value [H(M)] of the content, generated by the content distribution sever.

The present invention, in a fourth aspect thereof, provides a computer program for issuing a content-download-request in which a download destination that is different from an apparatus that executes the program is specified, the program comprising:

a step of obtaining a ticket carrying a digital signature of a second information processing apparatus that serves as a download destination of content;

a step of generating a content-download-request command including the ticket; and a step of sending the content-download-request command including the ticket to a content distribution server.

The present invention, in a fifth aspect thereof, provides a computer program for sending content, the program comprising:

a step of receiving, from a first information processing apparatus, a content-download-request process in which a second information processing apparatus is specified as a download destination that is different from the first information processing apparatus itself;

a step of verifying a digital signature included in a ticket carrying a digital signature of the second information processing apparatus serving as the download destination, the ticket being included in the content-download request; and a step of sending content to the second information processing apparatus on condition that the verification has succeeded.

A computer program according to the present invention is provided in a computer-readable form, for example, to a general-purpose computer system that is capable of executing various program codes, and can be provided using a storage medium or a communication medium, for example, a recording medium such as a CD, an FD, or an MO, or a communication medium such as a network. By providing the program in the computer-readable form, processes according to the program can be implemented on the computer system.

Other objects, features, and advantages of the present invention will become apparent from the following detailed description of embodiments of the present invention with reference to the accompanying drawings. In this specification, a system refers to a logical combination of a plurality of devices, without limitation to one in which constituting devices are disposed in the same case.

BEST MODE FOR CARRYING OUT THE INVENTION

[Overview of the System]

Figure 1:
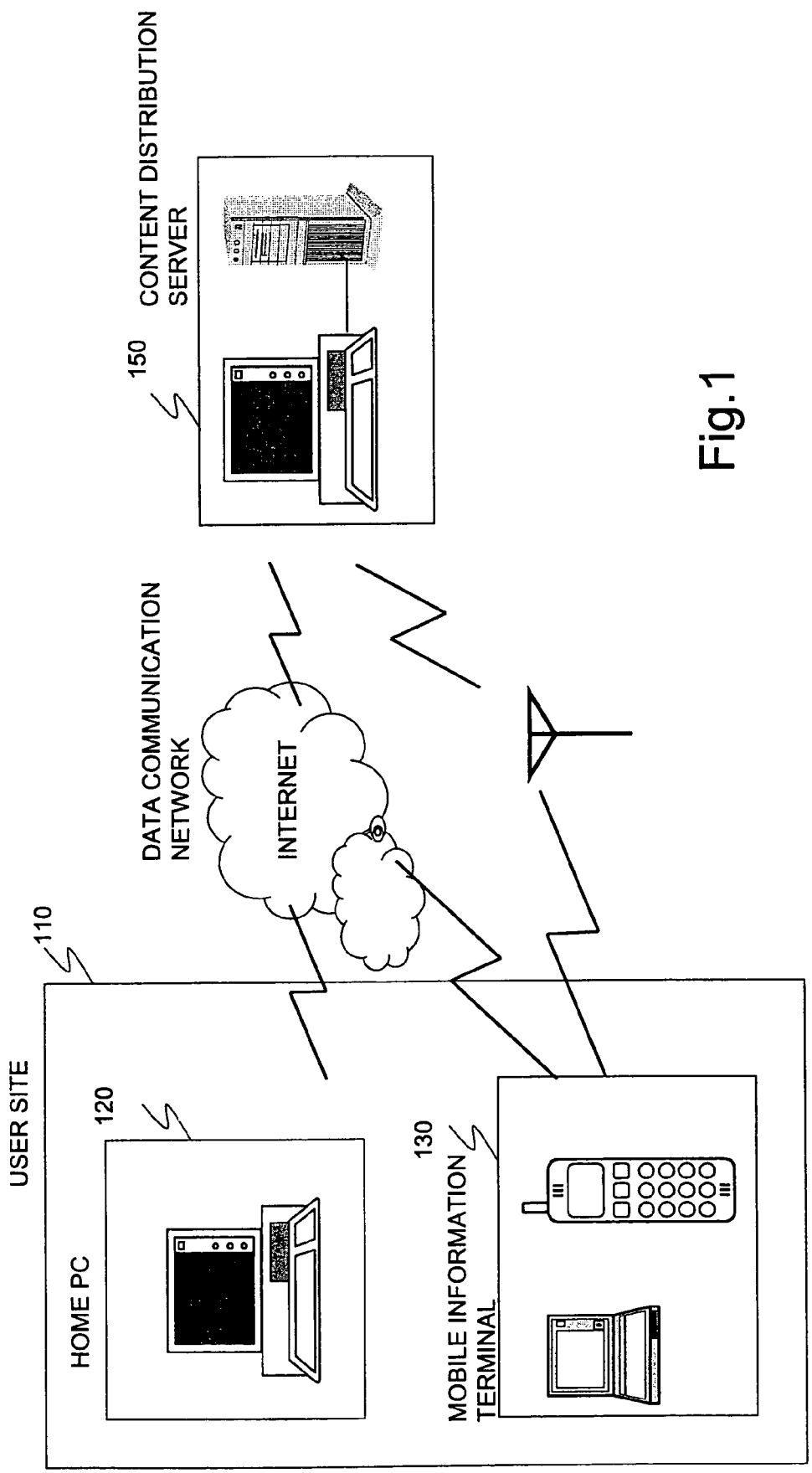
FIG. 1 is a diagram showing an overview of a content distribution system according to the present invention.

FIG. 1 shows an example configuration of content distribution for which a content distribution system according to the present invention can be used. Content is distributed from a content distribution server 150 to various user devices. FIG. 1 shows a plurality of information terminals owned by a user at a user site 110. A home PC 120 is an information processing apparatus provided at a home of the user, including a storage medium (home storage (HS)) of a large capacity, such as a hard disk. At the user site 110, mobile information terminals 130 such as a cellular phone and a PDA are provided. The mobile information terminals 130 are mobile information processing apparatuses that can be carried when, for example, the user goes outside.

The user accesses the content distribution server 150 using each of the home PC 120 having the home storage, and the mobile information terminals 130. A verification process is executed between each access device and the content distribution server 150 based on, for example, a public-key cryptosystem or a shared-key cryptosystem, verifying the authenticity of the device, that is, whether the device is authorized by the content distribution server to access content. After the verification, content is sent and downloaded. These processes employ a direct authentication with the device that serves as a download destination, which has hitherto been the case.

Furthermore, in the system according to the present invention, for example, a mobile information terminal 130 accesses the content distribution server 150, and specifies the home PC 120 as a download destination instead of the mobile information terminal 130, so that content can be sent from the content distribution server 150 and downloaded to the home PC 120.

For example, a user using a cellular phone at a visiting site accesses a content distribution server using the cellular phone, specifies a home PC as a download destination of content having a large volume, for example, moving-picture data such as a movie, so that the moving-picture content can be sent from the content distribution server and downloaded to the home PC.

Hitherto, it has been the case that the content distribution server 150 permits sending and downloading of content on condition that verification of a device that serves as a download destination succeeds. In the system according to the present invention, the user of the mobile information terminal 130 accesses the content distribution server 150 using the mobile information terminal 130, and participates in a proxy authentication on behalf of the home PC 120 to prove that the home PC is a trusted user device and has a legitimate right to access content. The content distribution server 150 sends content to the home PC 120 on condition that the proxy authentication succeeds.

User devices that serve as access devices for accessing a content distribution server and user devices that can be specified by the access devices as content-download destinations, such as the home PC 120 and the mobile information terminals 130 shown in FIG. 1, exchange device tickets that serve as certificates of the devices in advance with each other, and store a homenet-area shared secret key that serves as a shared secret key among the user devices in a storage medium of each of the devices.

Figure 2:
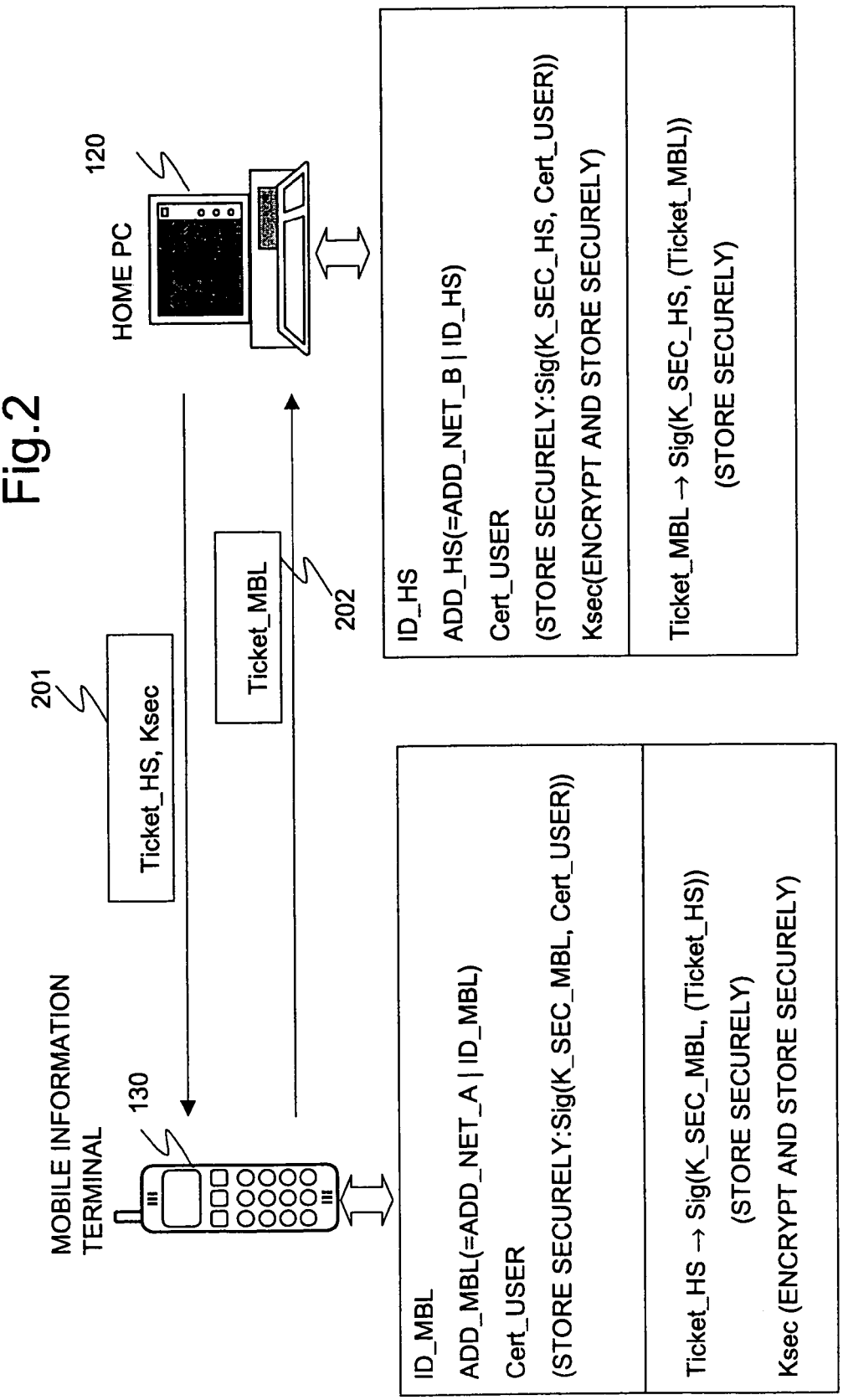
FIG. 2 is a diagram showing a device configuration, data stored, etc. in a homenet area in the content distribution system according to the present invention.

FIG. 2 shows a diagram for explaining information stored at user devices and processes executed between the user devices. In the following description, data, expressions, etc., will be designated by simply denoting a mobile information terminal as MBL (mobile) and a home PC as HS (home storage).

The mobile information terminal 130 has a device ID [ID_MBL] as a unique identifier that is assigned to each device at the time of manufacturing and stored in a memory of each device. The device ID is a fixed ID that cannot be rewritten. Also, an address for communication, for example, an IP address [ADD_MBL] based on IPv6, is set.

In the Internet, IP (Internet Protocol) is used as a communication protocol. IP that is currently in common use is IPv4, in which addresses (IP addresses) each having 32 bits are used for source and destination. However, the limited address space of IPv4, i.e., exhaustion of global addresses, has become problematic. This problem can be solved by IPv6 (Internet Protocol version 6), in which the IP address space is expanded from 32 bits to 128 bits. An IPv6 address consists of upper 64 bits representing routing information (network prefix) [ADD_NET_A] and lower 64 bits representing a host address for identifying an individual communication terminal, i.e., a host. The device ID [ID_MBL] described above can be used as a host address represented by the lower bits of an IPv6 address, setting the IP address [ADD_MBL] as [ADD_NET_A|ID_MBL].

Furthermore, the mobile information terminal 130 has a user certificate [Cert_User] issued by a settlement-service authentication server (CR) that executes authentication for settlement processes relating to content distribution. The user certificate is issued by the settlement-service authentication server (CR) in response to application of information needed for a settlement process to the settlement-service authentication server (CR) by a user wishing to receive a content-download service provided by a content distribution server.

The user certificate [Cert_User] is data obtained by digitally signing the user ID [ID_USR] and a public key [K_PUB_USR] of the user as a message, using a secret key [K_SEC_CR] of the settlement-service authentication server (CR). That is, [Cert_User]=[Sig(K_SEC_CR, (ID_USR, K_PUB_USR))]. In a digital signature, for example, a hash value obtained by using a hash function that serves as a one-way function and executing the hash function with a predetermined key is used. Sig(A, B) denotes digital-signature data obtained by applying A on B.

A recipient that has received the data carrying the digital signature similarly calculates a hash value using a key that the recipient owns, and checks for matching with the hash value assigned to the data, thereby verifying that the data has not been tampered with.

The mobile information terminal 130 signs the user certificate [Cert_User] issued by the settlement-service authentication server (CR), using a secret key [K_SEC_MBL] that it owns, and stores the result [Sig(K_SEC_MBL, Cert_User)] in a memory.

The home PC 120 has a device ID [ID_HS] as a unique identifier that is assigned to each device at the time of manufacturing and stored in a memory. The device ID is fixed and cannot be rewritten. Also, an address for communication, for example, an IP address [ADD_HS] based on IPv6, is set. In this address, similarly to the address of the mobile information terminal described earlier, with routing information (network prefix) [ADD_NET_B] represented by upper 64 bits of an IPv6 address, the device ID [ID_HS] described above can be used as lower 64 bits thereof, setting the address [ADD_HS] as [ADD_NET_B|ID_HS].

Furthermore, similarly to the mobile information terminal 130, the home PC 120 stores the user certificate [Cert_User] issued by the settlement-service authentication server (CR) that executes authentication for settlement processes relating to content distribution. The home PC 120 signs the user certificate [Cert_User] issued by the settlement-service authentication server (CR), using a secret key [K_SEC_HS] that it owns, and stores the result [Sig(K_SEC_HS, Cert_User)] in a memory.

Furthermore, the home PC 120 has a homenet-area shared secret key [Ksec]. The homenet-area shared secret key [Ksec] is transmitted, as required, to an access device that participates in a proxy authentication with the content distribution server as described earlier (the mobile information terminal 130 herein), and is also stored in the access device.

Each of the mobile information terminal 130 and the home PC 120 stores the data described above in a memory serving as storage means thereof. In order to carry out the downloading service to another device from the content distribution server, described earlier, data 201 is transmitted from the home PC 120 to the mobile information terminal 130, and data 202 is transmitted from the mobile information terminal 130 to the home PC 120, as shown in FIG. 2.

The exchange of data is carried out after verifying with each other that the two parties belong to the same homenet area, for example, by means of personal authentication, and tickets must be prevented from being leaked to other entities. The tickets that have been exchanged are stored securely by applying signatures of the recipients using secret keys of public-key pairs.

The data 201 transmitted from the home PC 120 to the mobile information terminal 130 includes a home-PC ticket [Ticket_HS] and the homenet-area shared secret key [Ksec]. The data 202 transmitted from the mobile information terminal 130 to the home PC 120 includes a mobile-information-terminal ticket [Ticket_MBL].

A ticket that is issued by a device A to a device B is data obtained by digitally signing an ID [ID_A] of the device A, an ID [ID_B] of the device B, and a public key [K_PUB_A] of the device A as a message, using a secret key [K_SEC_A] of the device A. That is, the ticket is [Sig(K_SEC_A, (ID_A, ID_B, K_PUB_A))].

That is, the home-PC ticket [Ticket_HS], i.e., the data 201 transmitted from the home PC 120 to the mobile information terminal 130, is data obtained by digitally signing the ID [ID_HS] of the home PC 120, the ID [ID_MBL] of the mobile information terminal 130, and a public key [K_PUB_HS] of the home PC 120 as a message, using a secret key

[K_SEC_HS] of the home PC 120. That is, the home-PC ticket [Ticket_HS] is [Sig(K_SEC_HS, (ID_HS, ID_MBL, K_PUB_HS))]. From the home PC 120, the home-PC ticket [Ticket_HS] and the homenet-area shared secret key [Ksec] are transmitted to the mobile information terminal 130.

In third and fourth examples of the content distribution process, which will be described later, a pair of public key and secret key is used instead of Ksec, and the public key is used in a manner different from an ordinary use. More specifically, for example, a public key pair that is used instead of Ksec is prepared separately for a particular purpose, and a public key is made public only within a home area. Accordingly, only devices in the home area are allowed to obtain Ksig. According to this method, as opposed to an arrangement in which Ksec is shared, each device has an individual secret key. Thus, this method is suitable for an application in which individual devices are discriminated for the purpose of security.

The mobile-information-terminal ticket [Ticket_MBL], i.e., the data 202 transmitted from the mobile information terminal 130 to the home PC 120, is data obtained by digitally signing the ID [ID_MBL] of the mobile information terminal 130, the ID [ID_HS] of the home PC 120, and a public key [K_PUB_MBL] of the mobile information terminal 130 as a message, using a secret key [K_SEC_MBL] of the mobile information terminal 130. That is, the mobile-information-terminal ticket [Ticket_MBL] is [Sig(K_SEC_MBL, (ID_MBL, ID_HS, K_PUB_MBL))].

The mobile information terminal 130 stores, in a memory thereof, the home-PC ticket [Ticket_HS] and the homenet-area shared secret key [Ksec] transmitted from the home PC 120. The home PC 120 stores, in a memory thereof, the mobile-information-terminal ticket [Ticket_MBL] transmitted from the mobile information terminal 130.

In the configuration shown in FIG. 2, the mobile information terminal 130 serves as an information processing apparatus for issuing a download request in which the home PC 120 is specified as a download destination that is different from the mobile information terminal 130 itself. The mobile information terminal 130 stores, in a memory serving as storage means thereof, a ticket carrying a digital signature of the information processing apparatus serving as a content-download destination (the home PC 120). Control means of the mobile information terminal 130, such as a CPU, generates a content-download-request command including the ticket stored in the memory, and sends the content-download-request command to the content distribution server via communication means. Now, a content distribution process in the system according to the present invention will be described in detail.

[First Example of Content Distribution Process]

Now, a plurality of processing modes of examples of the content distribution process in the content distribution system according to the present invention will be described in order. The following description will be made in the context of a process in which a mobile information terminal accesses a content distribution server and content is downloaded to a home PC having a home storage. The reverse process, i.e., a process in which the home PC accesses the content distribution sever and content is downloaded to the mobile information terminal, can be executed by similar processing steps. Terminals owned by users can be used in arbitrary combination as an accessing terminal and a downloading terminal that work in combination with a content distribution server.

Figure 3:
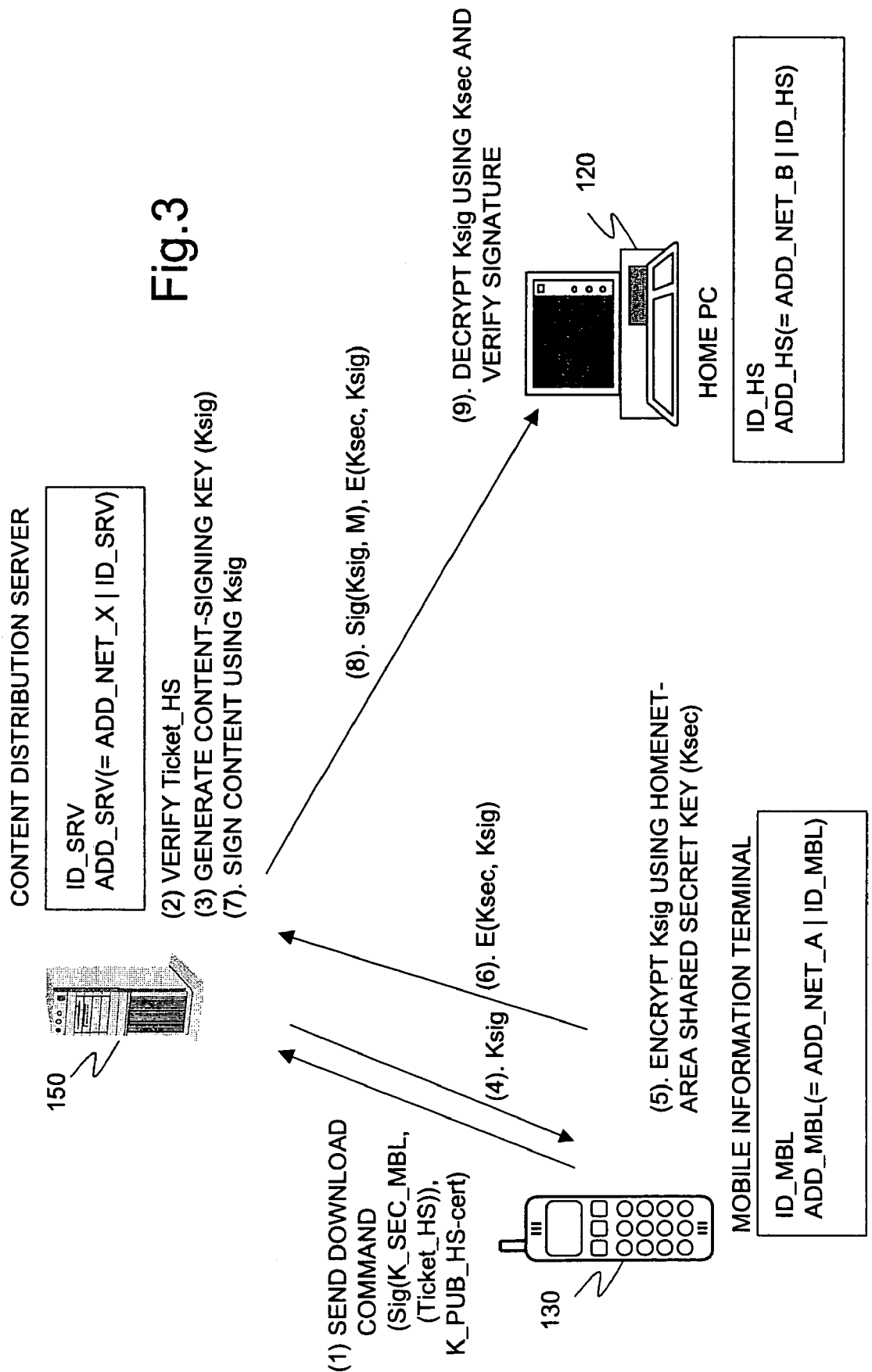
FIG. 3 is a diagram showing a processing sequence of a first example of content distribution process in the content distribution process according to the present invention.
Figure 4:
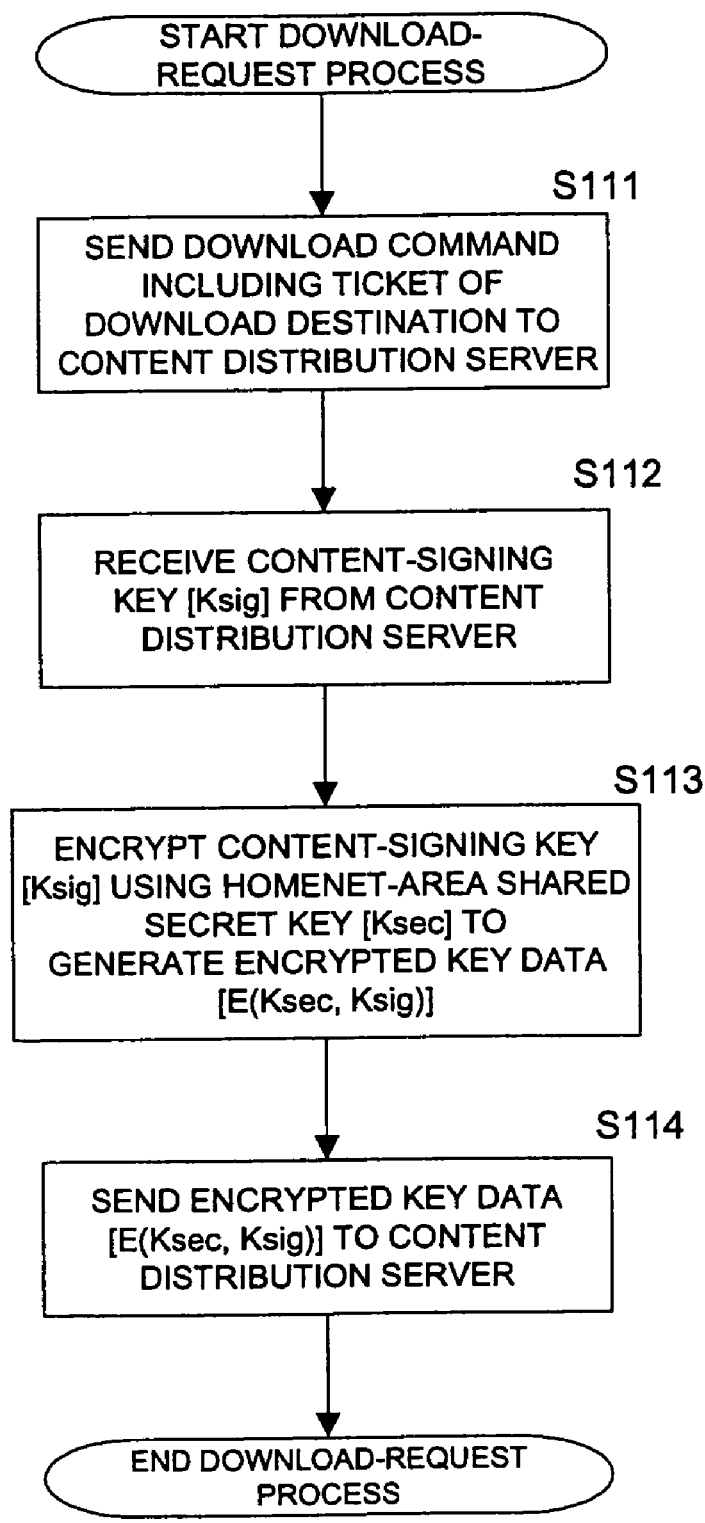
FIG. 4 is diagram showing a flowchart of a process executed by a mobile information terminal that serves as a download-requesting device in the first example of content distribution process of the content distribution system according to the present invention.
Figure 5:
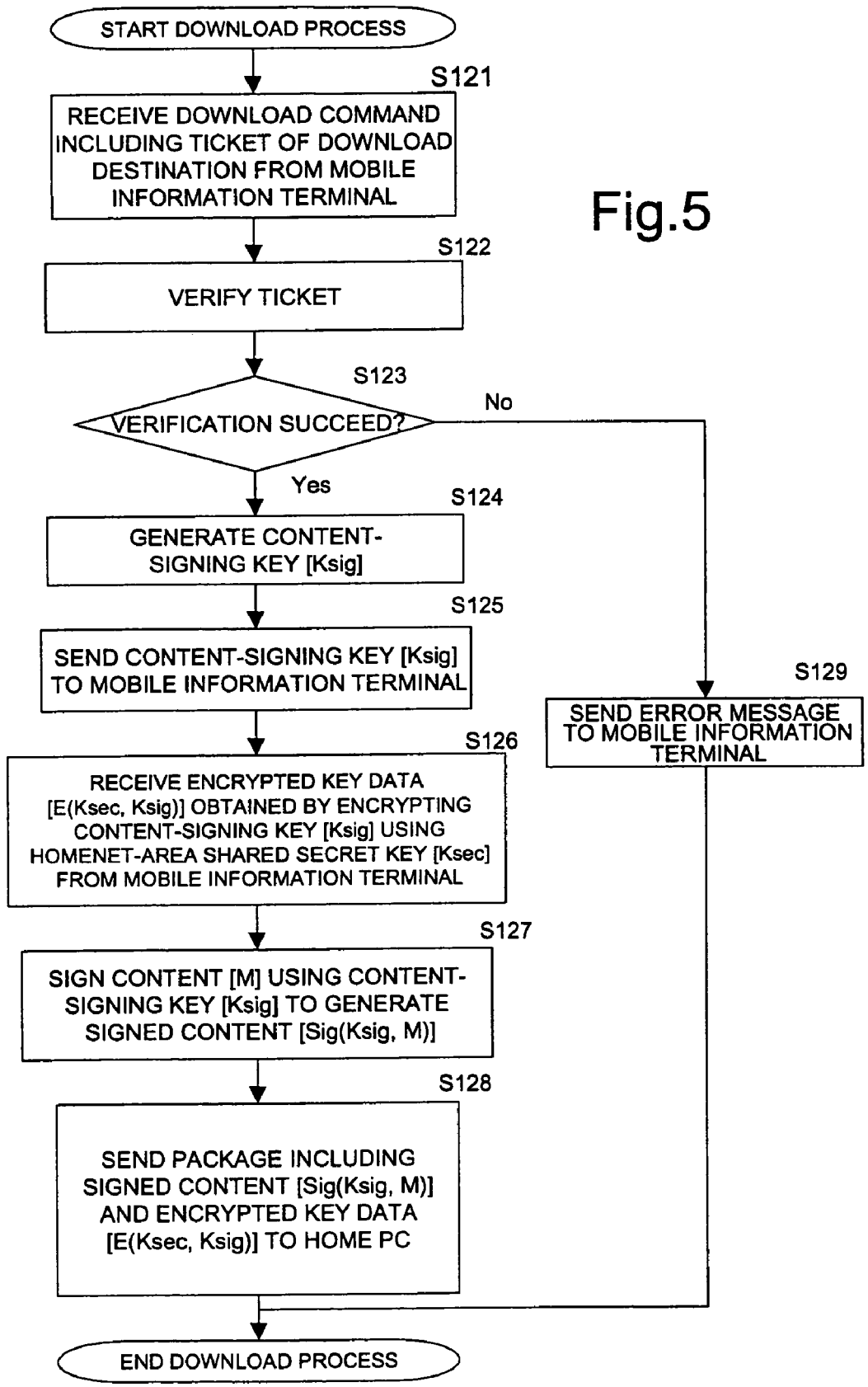
FIG. 5 is a diagram showing a flowchart of a process executed by a content distribution server in the first example of content distribution process of the content distribution system according to the present invention.
Figure 6:
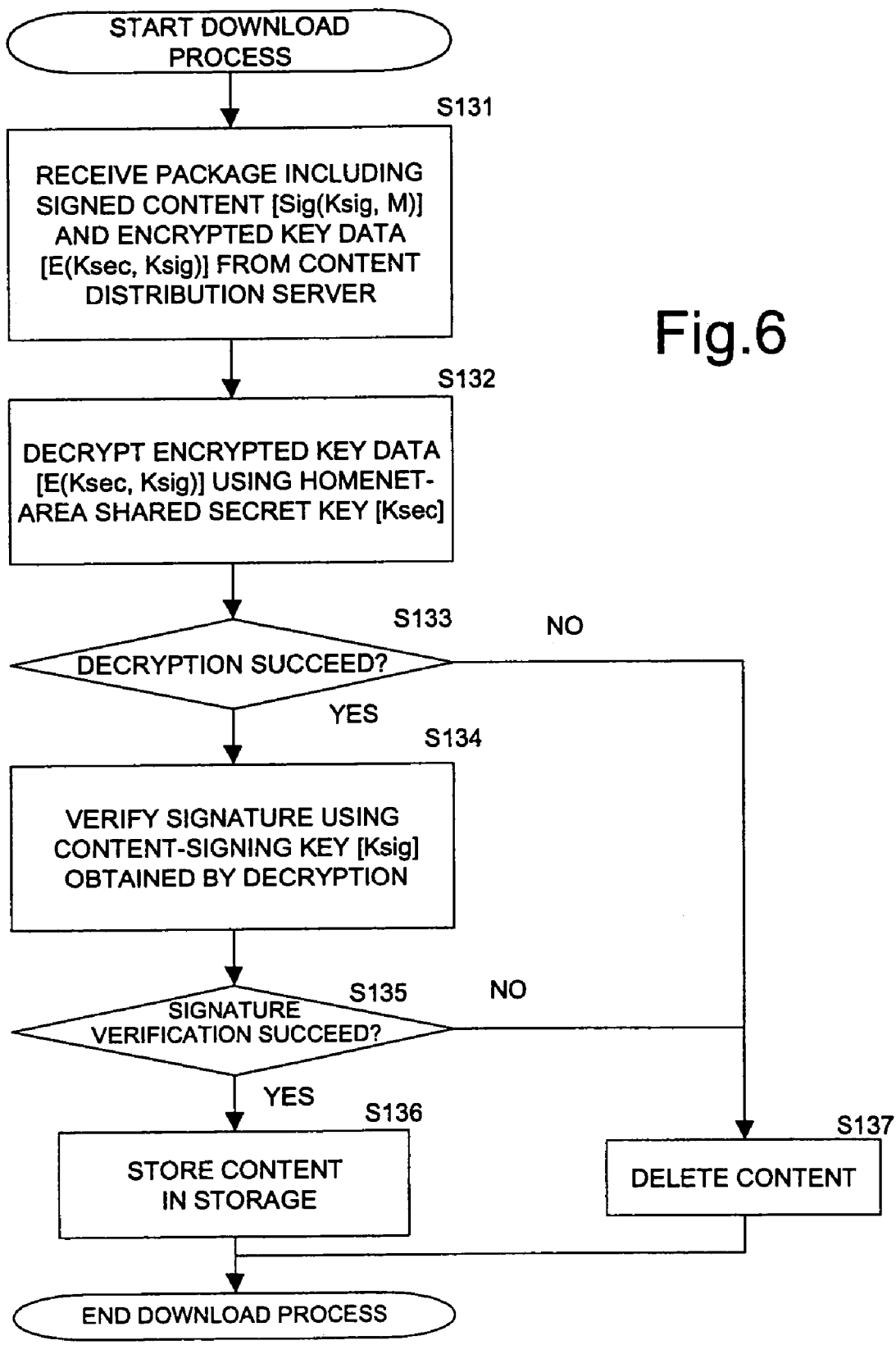
FIG. 6 is a diagram showing a flowchart of a process executed by a home PC that serves as a download-destination device in the first example of content distribution process of the content distribution system according to the present invention.

First, a first example of the content distribution process will be described with reference to FIGS. 3 to 6. FIG. 3 is a sequence diagram showing a process executed among three parties, namely, a content distribution server, a mobile information terminal for accessing the content distribution server, and a home PC for downloading content according to a request from the mobile information terminal, the home PC having a home storage that serves as a large-capacity storage medium. FIG. 4 is a flowchart showing a process executed by the mobile information terminal. FIG. 5 is a flowchart showing a process executed by the content distribution server. FIG. 6 is a flowchart showing a process executed by the home PC.

The process according to this embodiment will be described with reference to FIG. 3. The process proceeds in order from numbers (1) to (9) shown in FIG. 3.

Referring to FIG. 3, the mobile information terminal 130 has an identifier (ID) [ID_MBL] and an address [ADD_MBL]. This corresponds to [ADD_NET_A|ID_MBL]. Furthermore, the mobile information terminal 130 has the homenet-area shared secret key [Ksec]. The home PC 120 has an identifier (ID) [ID_HS] and an address [ADD_HS]. This corresponds to [ADD_NET_B|ID_HS]. Furthermore, the home PC 120 has the homenet-area shared secret key [Ksec]. The content distribution server has an identifier (ID) [ID_SRV] and an address [ADD_SRV]. This corresponds to [ADD_NET_X|ID_SRV].

First, in step (1), the mobile information terminal 130 issues to the content distribution server 150 a request for downloading content. The download request includes the home-PC ticket [Ticket_HS] received from a device that serves as a download destination, i.e., the home PC 120 herein, and a public-key certificate [K_PUB_HS-cert] including a public key of the home PC 120 serving as the download destination. The public-key certificate may be separately obtained from a certificate authority (CA). The home-pc ticket [Ticket_HS] is data obtained by digitally signing the ID [ID_HS] of the home PC 120, the ID [ID_MBL] of the mobile information terminal 130, and the public key [K_PUB_HS] of the home PC 120 as a message, using the secret key [K_SEC_HS] of the home PC 120. That is, the home-pc ticket [Ticket_HS] is [Sig(K_SEC_HS, (ID_HS, ID_MBL, K_PUB_HS))].

The content distribution server 150, having received the home-pc ticket [Sig(K_SEC_MBL, (Ticket_HS))] and the public-key certificate [K_PUB_HS-cert] of the home PC 120 from the mobile information terminal 130, verifies the signature on the home-pc ticket [Sig(K_SEC_MBL, (Ticket_HS))] using a public key of the mobile information terminal 130, obtained from a public-key certificate of the mobile information terminal 130. In step (2), the content distribution server 150 verifies the home-pc ticket [Ticket_HS]. The procedure of the verification includes (a) verifying the validity of the public-key certificate [K_PUB_HS-cert] of the home PC 120 by verifying a signature on the public-key certificate [K_PUB_HS-cert] (a signature of a certificate authority); (b) obtaining the public key [K_PUB_HS] of the home PC 120 from the public-key certificate [K_PUB_HS-cert] whose validity has been verified; and (c) verifying the signature on the home-pc ticket [Ticket_HS], i.e., [Sig(K_SEC_HS, (ID_HS, ID_MBL, K_PUB_HS))], using the public key [K_PUB_HS] of the home PC 120.

If it is verified by the procedure, i.e., the verification of the home-pc ticket [Ticket_HS], that the home-pc ticket [Ticket_HS] is a valid ticket that has not been tampered with, in step (3), the content distribution server 150 generates a content-signing key [Ksig]. This is a key for temporary use, and is generated, for example, based on a random number generated by a random-number generator. Then, in step (4), the content distribution server 150 sends the content-signing key [Ksig] to the mobile information terminal 130.

In step (5), the mobile information terminal 130, having received the content-signing key [Ksig], encrypts the content-signing key [Ksig] using the homenet-area shared secret key [Ksec], thereby generating encrypted key data [E(Ksec, Ksig)]. The encryption is executed based on, for example, DES encryption. E(A, B) denotes data obtained by encrypting B using A. Then, in step (6), the mobile information terminal 130 sends the encrypted key data [E(Ksec, Ksig)] to the content distribution server 150.

In step (7), the content distribution server 150 digitally signs content (M) to be downloaded, using the content-signing key [Ksig] generated earlier, thereby generating signed content data [Sig(Ksig, M)].

Then, in step (8), the content distribution server 150 sends the signed content data [Sig(Ksig, M)] and the encrypted key data [E(Ksec, Ksig)] received from the mobile information terminal 130 earlier in step (5) to the home PC 120 serving as the download destination.

Then, in step (9), the home PC 120, having received the signed content data [Sig(Ksig, M)] and the encrypted key data [E(Ksec, Ksig)], decrypts the encrypted key data [E(Ksec, Ksig)] using the homenet-area shared secret key [Ksec] that it owns, thereby obtaining the content-signing key [Ksig], and verifies the signature on the signed content data [Sig(Ksig, M)]. The content is stored or played back on condition that the signature verification has proved that the data of the content (M) has not been tampered with.

Next, a process executed by the mobile information terminal 130, a process executed by the content distribution server 150, and a process executed by the home PC 120 will be described with reference to flowcharts shown in FIGS. 4 to 6, respectively.

First, the procedure of the process executed by the mobile information terminal 130 will be described with reference to the flowchart shown in FIG. 4. First, in step S11, the mobile information terminal 130 sends data including a device ticket of a device that serves as a download destination, i.e., the home-pc ticket [Ticket_HS] of the home PC 120 herein, to the content distribution server 150, thereby requesting downloading of content.

In step S112, the mobile information terminal 130 receives a content-signing key [Ksig] generated by the content distribution server 150.

In step S113, the mobile information terminal 130, having received the content-signing key [Ksig], encrypts the content-signing key [Ksig] using the homenet-area shared secret key [Ksec], thereby generating encrypted key data [E(Ksec, Ksig)]. In step S114, the mobile information terminal 130 sends the encrypted key data [E(Ksec, Ksig)] to the content distribution server 150.

The process described above is executed by the mobile information terminal 130 in a content-download-request process executed between the mobile information terminal 130 and the content distribution server 150.

Next, a process executed by the content distribution server 150 that receives a content-download-request command from the mobile information terminal 130 will be described with reference to FIG. 5.

First, in step S121, the content distribution server 150 receives data including a device ticket of a download destination, i.e., the home-pc ticket [Ticket_HS] of the home PC 120 herein, from the mobile information terminal 130 as a download command.

In step S122, the content distribution server 150, having received the download command including the home-pc ticket [Ticket_HS] from the mobile information terminal 130, verifies the home-pc ticket [Ticket_HS]. As described earlier, the verification is executed by verifying the public-key certificate [K_PUB_HS-cert] of the home PC 120 by verifying a signature on the public-key certificate [K_PUB_HS-cert] (a signature of a certificate authority); obtaining the public key [K_PUB_HS] of the home PC 120 from the public-key certificate [K_PUB_HS-cert] whose validity has been verified; and verifying the signature on the home-pc ticket [Ticket_HS], i.e., [Sig(K_SEC_HS, (ID_HS, ID_MBL, K_PUB_HS))], using the public key [K_PUB_HS] of the home PC 120.

If it is determined in step S123 that the verification of the ticket has failed, the ticket, i.e., the home-pc ticket [Ticket_HS], has possibly been forged. Then, the process proceeds to step S129, in which an error message is sent to the mobile information terminal 130. The process is then exited. In this case, a content-download process is not executed.

If it is determined in step S123 that the verification of the ticket has succeeded, the process proceeds to step S124, in which a content-signing key [Ksig] is generated. Then, in step S125, the content-signing key [Ksig] is sent to the mobile information terminal 130.

Then, in step S126, the content distribution server 150 receives encrypted key data [E(Ksec, Ksig)] obtained by encrypting the content-signing key [Ksig] using the homenet-area shared secret key [Ksec] from the mobile information terminal 130.

Then, in step S127, the content distribution server 150 digitally signs content (M) to be downloaded, using the content-signing key [Ksig] generated earlier, thereby generating signed content data [Sig(Ksig, M)].

Then, in step S128, the content distribution server 150 sends the signed content data [Sig(Ksig, M)] and the encrypted key data [E(Ksec, Ksig)] received earlier from the mobile information terminal 130 to the home PC 120 serving as the download destination.

The process described above is executed by the content distribution server 150 that has received a content-download request from the mobile information terminal 130.

Next, a process executed by the home PC 120 to which content is downloaded from the content distribution server 150 will be described with reference to FIG. 6.

In step S131, the home PC 120 receives the signed content data [Sig(Ksig, M)] and the encrypted key data [E(Ksec, Ksig)] from the content distribution server 150.

In step S132, the home PC 120 decrypts the encrypted key data [E(Ksec, Ksig)], using the homenet-area shared secret key [Ksec] that it owns.

If the decryption fails in step S133, the homenet-area shared secret key [Ksec] could be illegitimate; for example, it differs from the key owned by the mobile information terminal 130. Then, the process proceeds to step S137, in which the content received is discarded.

If the decryption succeeds in step S133, the signature on the signed content data [Sig(Ksig, M)] is verified using the content-signing key [Ksig] obtained by the decryption. If the verification of the signature fails (No in S135), the content could have possibly been tampered with. Then, the process proceeds to step S137, in which the content received is discarded.

If the verification of the signature succeeds (Yes in S135), in step S136, the content received is stored in the storage of the home PC 120. The download process is then exited.

The process described above is executed by the home PC 120 that receives and downloads content from the content distribution server 150 having received a content-download request from the mobile information terminal 130.

As described above, according to this embodiment, the content distribution server 150 is allowed to verify a device ticket of a content-download destination, received from the mobile information terminal 130, and is thus allowed to verify, based on a home-PC ticket transmitted from the mobile information terminal 130, that the home PC 120 is a download destination authorized by the mobile information terminal 130.

That is, according to the present invention, a content distribution server receives a ticket carrying a signature of a device that serves as a content-download destination from an information processing apparatus, e.g., a mobile information terminal, that requests downloading of content, and verifies the ticket. Thus, it is possible to verify that an information processing apparatus that serves as a content-download destination, e.g., a home PC, is a download destination authorized by the mobile information terminal. That is, it is possible to verify the authenticity of a device that serves as a download destination without directly authenticating the device serving as the download destination.

Furthermore, according to this embodiment, the content-signing key [Ksig] is encrypted using the homenet-area shared secret key [Ksec] shared by the home PC 120 and the mobile information terminal 130. The result is transmitted from the mobile information terminal 130 via the content distribution server 150 to the home PC 120 that serves as a download destination, and is decrypted using the homenet-area shared secret key [Ksec] owned by the home PC 120, whereby the content-signing key [Ksig] is obtained. Thus, the content-signing key [Ksig] can be obtained at the home PC 120 serving as the download destination on condition that the home PC 120 and the mobile information terminal 130 share the same homenet-area shared secret key [Ksec]. Accordingly, valid content can be downloaded only among devices that share the same homenet-area shared secret key [Ksec].

[Second Example of Content Distribution Process]

Next, a second example of the content distribution process will be described. In the second example of the content distribution process, the content distribution server 150 calculates a hash value of content, the hash value is encrypted using the homenet-area shared secret key [Ksec] shared by the home PC 120 and the mobile information terminal 130, and the result is transmitted from the mobile information terminal 130 via the content distribution server 150 to the home PC 120 that serves as a download destination.

Figure 7:
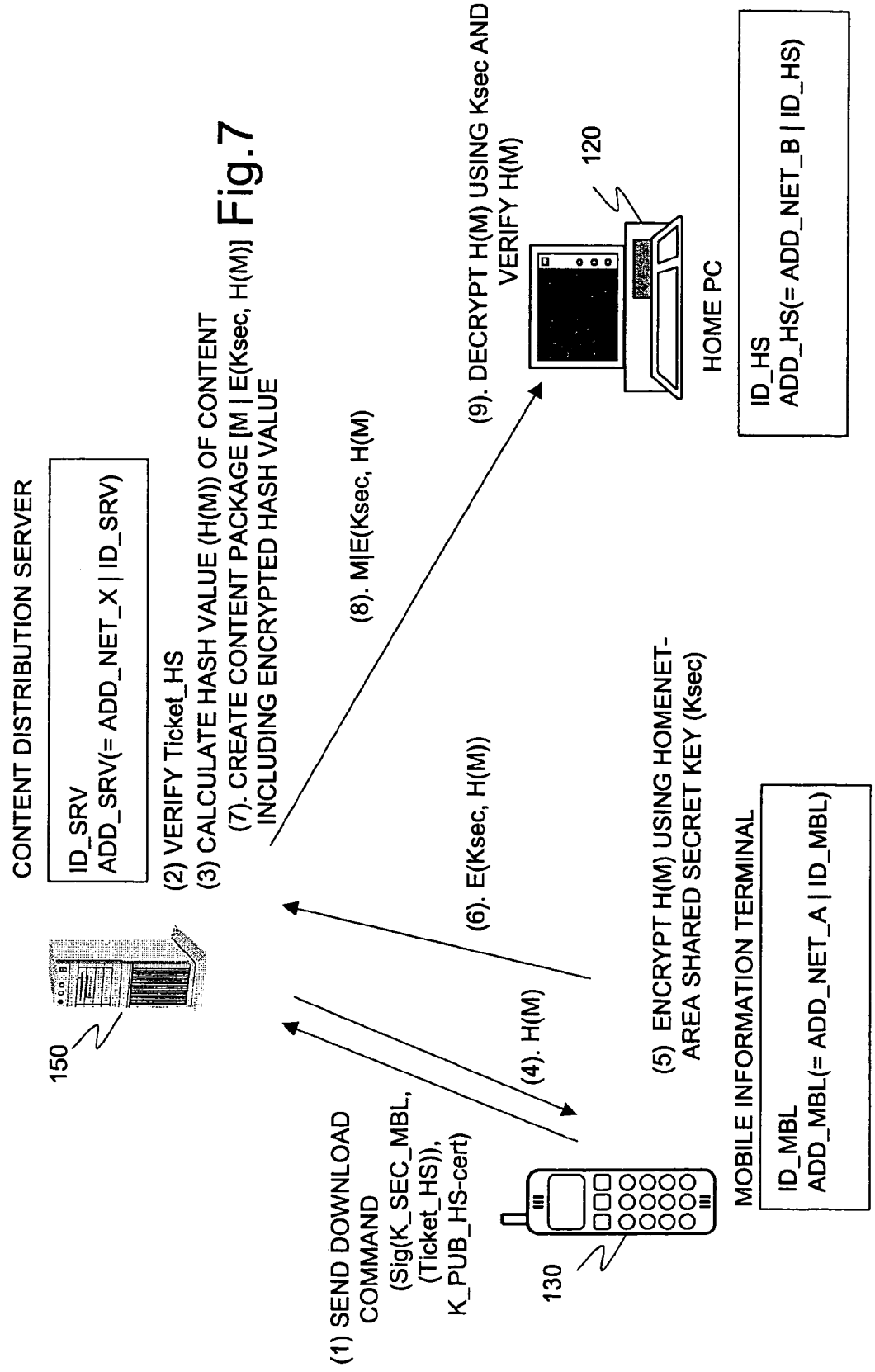
FIG. 7 is a diagram showing a processing sequence of a second example of content distribution process of the content distribution system according to the present invention.
Figure 8:
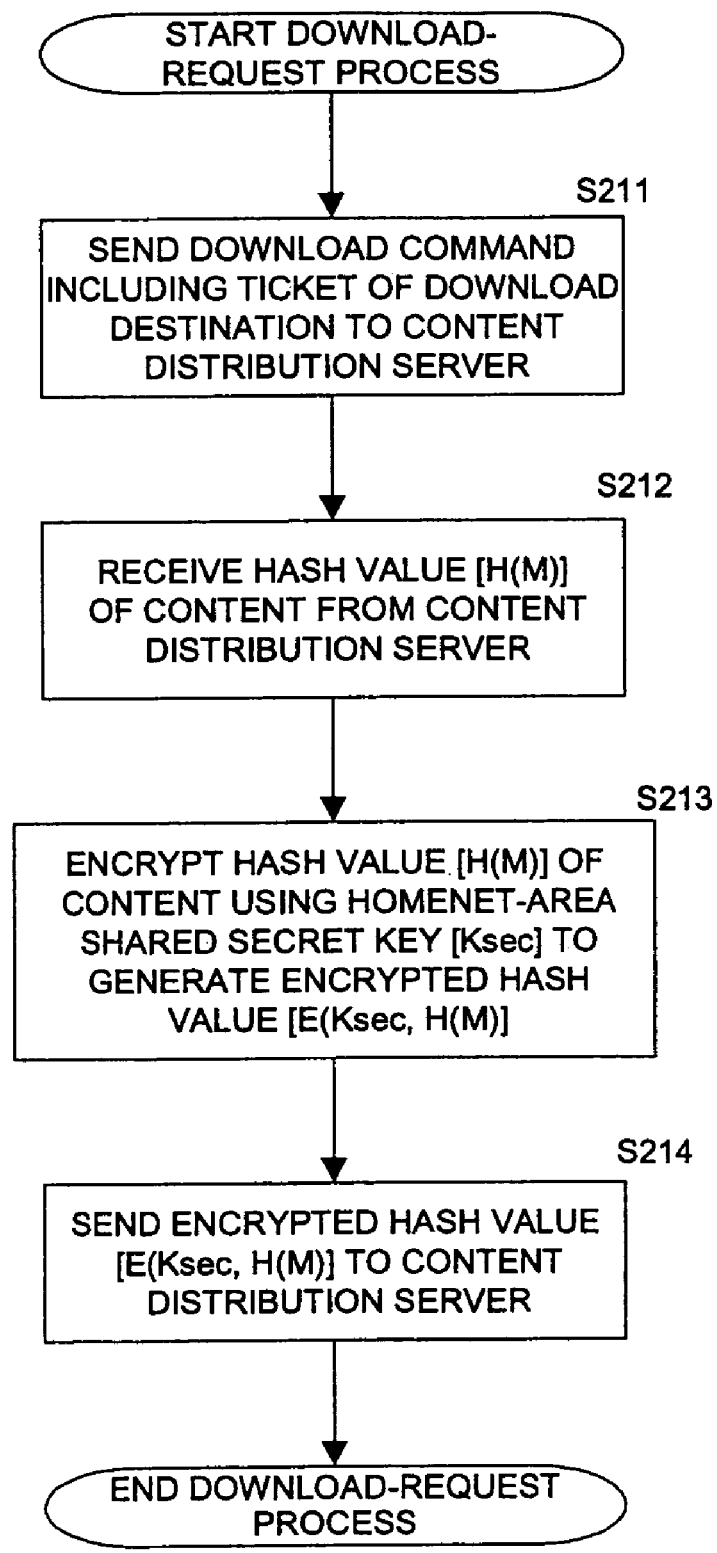
FIG. 8 is a diagram showing a flowchart of a process executed by a mobile information terminal that serves as a download-requesting device in the second example of content distribution process of the content distribution system according to the present invention.
Figure 9:
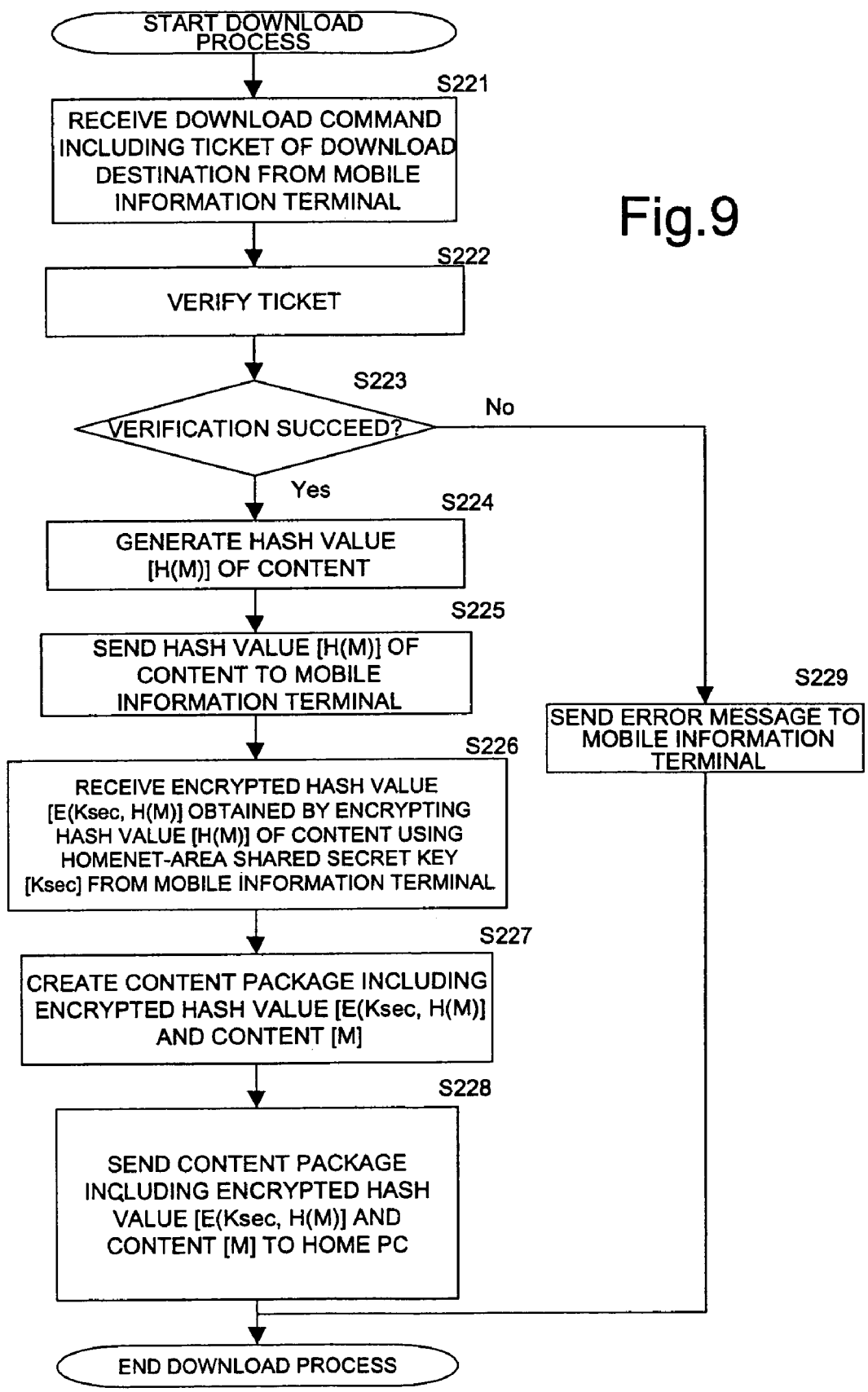
FIG. 9 is a diagram showing a flowchart of a process executed by a content distribution server in the second example of content distribution process of the content distribution system according to the present invention.
Figure 10:
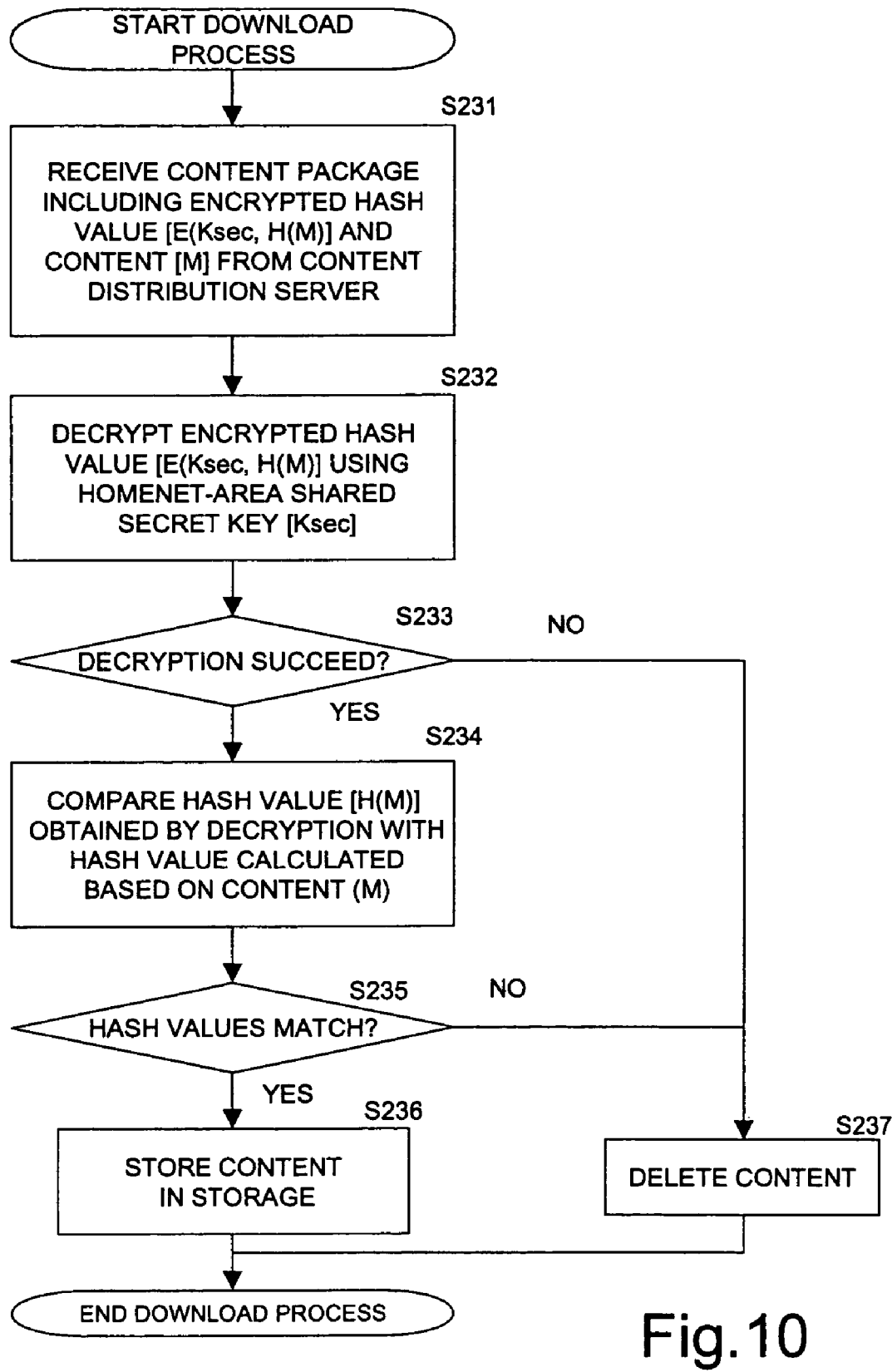
FIG. 10 is a diagram showing a flowchart of a process executed by a home PC that serves as a download-destination device in the second example of content distribution process of the content distribution system according to the present invention.

The second example of the content distribution process will be described with reference to FIGS. 7 to 10. FIG. 7 is a sequence diagram showing a process executed among three parties, namely, a content distribution server, a mobile information terminal for accessing the content distribution server, and a home PC for downloading content according to a request from the mobile information terminal, the home PC having a home storage that serves as a large-capacity storage medium. FIG. 8 is a flowchart showing a process executed by the mobile information terminal. FIG. 9 is a flowchart showing a process executed by the content distribution server. FIG. 10 is a flowchart showing a process executed by the home PC.

The process according to this embodiment will be described with reference to FIG. 7. The process proceeds in order from numbers (1) to (9) shown in FIG. 7.

First, in step (1), the mobile information terminal 130 issues to the content distribution server 150 a request for downloading content. The download request includes a home-pc ticket [Ticket_HS] received from a device that serves as a download destination, i.e., the home PC 120 herein, and a public-key certificate [K_PUB_HS-cert] including a public key of the home PC 120 that serving as the download destination. The home-pc ticket [Ticket_HS] is data obtained by digitally signing the ID [ID_HS] of the home PC 120, the ID [ID_MBL] of the mobile information terminal 130, and the public key [K_PUB_HS] of the home PC 120 as a message, using the secret key [K_SEC_HS] of the home PC 120. That is, the home-pc ticket [Ticket_HS] is [Sig (K_SEC_HS, (ID_HS, ID_MBL, K_PUB_HS))].

The content distribution server 150, having received the home-PC ticket [Sig(K_SEC_MBL, (Ticket_HS))] and the public-key certificate [K_PUB_HS-cert] of the home PC 120 from the mobile information terminal 130, verifies the signature on the home-PC ticket [Sig(K_SEC_MBL, (Ticket_HS))], using the public key of the mobile information terminal 130, obtained from a public-key certificate of the mobile information terminal 130. In step (2), the content distribution server 150 verifies the signature on the home-pc ticket [Ticket_HS]. The procedure of the verification includes (a) verifying the validity of the public-key certificate [K_PUB_HS-cert] of the home PC 120 by verifying a signature on the public-key certificate [K_PUB_HS-cert] (a signature of a certificate authority); (b) obtaining the public key [K_PUB_HS] of the home PC 120 from the public-key certificate [K_PUB_HS-cert] whose validity has been verified; and (c) verifying the signature on the home-pc ticket [Ticket_HS], i.e., [Sig(K_SEC_HS, (ID_HS, ID_MBL, K_PUB_HS))], using the public key [K_PUB_HS] of the home PC 120.

If it is verified by the procedure, i.e., the verification of the home-pc ticket [Ticket_HS], that the home-pc ticket [Ticket_HS] is a valid ticket that has not been tampered with, in step (3), the content distribution server 150 calculates a hash value [H(M)] of the content. Then, in step (4), the content distribution server 150 sends the hash value [H(M)] of the content to the mobile information terminal 130.

In step (5), the mobile information terminal 130, having received the hash value [H(M)] of the content, encrypts the hash value [H(M)] of the content using the homenet-area shared secret key [Ksec], thereby generating an encrypted hash value [E(Ksec, H(M))]. Then, in step (6), the mobile information terminal 130 sends the encrypted hash value [E(Ksec, H(M))] to the content distribution server 150.

In step (7), the content distribution server 150 creates a content package [M|E(Ksec, H(M))] including the encrypted hash value [E(Ksec, H(M))] and the content (M). Then, in step (8), the content distribution server 150 sends the content package [M|E(Ksec, H(M))] to the home PC 120 that serves as a download destination.

Then, in step (9), the home PC 120, having received the content package [M|E(Ksec, H(M))], decrypts the encrypted hash value [E(Ksec, H(M))] included in the content package [M|E(Ksec, H(M))], using the homenet-area shared secret key [Ksec] that it owns, thereby obtaining the content-signing key [Ksig] and obtaining the hash value [H(M)] of the content. Furthermore, the home PC 120 calculates a hash value of the content (M), and checks matching of the two hash values. If the hash values match, it is determined that the content has not been tampered with. If the hash values do not match, it is determined that the content has been tampered with. The content is stored or played back on condition that the verification has proved that the data of the content (M) has not been tampered with.

Next, a process executed by the mobile information terminal 130, a process executed by the content distribution server 150, and a process executed by the home PC 120 will be described with reference to flowcharts shown in FIGS. 8 to 10, respectively.

First, the procedure of the process executed by the mobile information terminal 130 will be described with reference to the flowchart shown in FIG. 8. In step S211, the mobile information terminal 130 sends data including a device ticket of a device that serves as a download destination, i.e., the home-pc ticket [Ticket_HS] of the home PC 120 herein, to the content distribution server 150, thereby requesting downloading of content.

In step S212, the mobile information terminal 130 receives a hash value [H(M)] of the content, generated by the content distribution server 150.

In step S213, the mobile information terminal 130, having received the hash value [H(M)] of the content, encrypts the hash value [H(M)] of the content using the homenet-area shared secret key [Ksec], thereby generating an encrypted hash value [E(Ksec, H(M))]. In step S214, the mobile information terminal 130 sends the encrypted hash value [E(Ksec, H(M))] to the content distribution server 150.

The process described above is executed by the mobile information terminal 130 in a content-download-request process executed between the mobile information terminal 130 and the content distribution server 150.

Next, the process executed by the content distribution server 150 that receives a content-download-request command from the mobile information terminal 130 will be described with reference to FIG. 9.

First, in step S221, the content distribution server 150 receives data including a device ticket of a download destination, i.e., the home-pc ticket [Ticket_HS] of the home PC 120 herein, from the mobile information terminal 130 as a download command.

In step S222, the content distribution server 150, having received the download command including the home-pc ticket [Ticket_HS] from the mobile information terminal 130, verifies the home-pc ticket [Ticket_HS]. The verification process is the same as that described earlier.

If it is determined in step S223 that the verification of the ticket has failed, the ticket, i.e., the home-pc ticket [Ticket_HS], has possibly been forged. Then, the process proceeds to step S229, in which an error message is sent to the mobile information terminal 130. The process is then exited. In this case, a content-download process is not executed.

If it is determined in step S223 that the verification of the ticket has succeeded, the process proceeds to step S224, in which a hash value [H(M)] of the content is generated. In step S225, the hash value [H(M)] of the content is sent to the mobile information terminal 130.

Then, in step S226, the content distribution server 150 receives an encrypted hash value [E(Ksec, H(M))] obtained by encrypting the hash value [H(M)] of the content using the homenet-area shared secret key [Ksec] from the mobile information terminal 130.

Then, in step S227, the content distribution server 150 creates a content package [M|E(Ksec, H(M))] including the encrypted hash value [E(Ksec, H(M))] received from the mobile information terminal 130 and the content (M).

Then, in step S228, the content distribution server 150 sends the content package [M|E(Ksec, H(M))] to the home PC 120 that serves as a download destination.

The process described above is executed by the content distribution server 150 that has received a content-download request from the mobile information terminal 130.

Next, a process executed by the home PC 120 to which content is downloaded from the content distribution server 150 will be described with reference to FIG. 10.

In step S231, the home PC 120 receives the content package [M|E(Ksec, H(M))] from the content distribution server 150.

In step S232, the home PC 120 decrypts the encrypted hash value [E(Ksec, H(M))] included in the content package [M|E(Ksec, H(M))], using the homenet-area shared secret key [Ksec] that it owns.

If the decryption fails in step S233, the homenet-area shared secret key [Ksec] could be illegitimate; for example, it differs from the key owned by the mobile information terminal 130. Then, the process proceeds to step S237, in which the content received is discarded.

If the decryption succeeds in step S233, the hash value [H(M)] of the content, obtained by the decryption, is compared with a hash value H(M)' calculated based on the content (M). If the hash values compared do not match (No in S235), the content has possibly been tampered with. Then, the process proceeds to step S237, in which the content received is discarded.

If the hash values match (Yes in S235), in step S236, the content received is stored in the storage of the home PC 120. The download process is then exited.

The process described above is executed by the home PC 120 that receives and downloads content from the content distribution server 150 having received a content-download request from the mobile information terminal 130.

As described above, according to this embodiment, the content distribution server 150 is allowed to verify a device ticket of a content-download destination, received from the mobile information terminal 130, and is therefore allowed to verify, based on a home-PC ticket transmitted from the mobile information terminal 130, that the home PC 120 is a download destination authorized by the mobile information terminal 130. That is, a content distribution server receives and a ticket carrying a signature of a device that serves as a content-download destination from an information processing apparatus, e.g., a mobile information terminal, that requests downloading of content, and verifies the ticket. Thus, it is possible to verify an information processing apparatus that serves as a download destination, e.g., a home PC, is a download destination authorized by the mobile information terminal. That is, it is possible to verify the authenticity of a device that serves as a download destination without directly authenticating the device serving as the download destination.

Furthermore, according to this embodiment, a hash value [H(M)] of content is encrypted using the homenet-area shared secret key [Ksec] shared by the home PC 120 and the mobile information terminal 130. The result is transmitted from the mobile information terminal 130 via the content distribution server 150 to the home PC 120 that serves as a download destination, and is decrypted using the homenet-area shared secret key [Ksec] owned by the home PC 120, whereby the hash value [H(M)] of the content is obtained, which is compared with a hash value calculated by the home PC 120 itself based on the content. Thus, hash values can be compared at the home PC 120 serving as the download destination on condition that the home PC 120 and the mobile information terminal 130 share the same homenet-area shared secret key [Ksec]. Accordingly, valid content can be downloaded only among devices that have the same homenet-area shared secret key [Ksec].

[Third Example of Content Distribution Process]

Next, a third example of the content distribution process will be described. In the third example of the content distribution process, the homenet-area shared secret key [Ksec] used in the first and second examples of the content distribution process is not used, and instead a pair of public key and secret key of an ordinary public-key cryptosystem is used. The content distribution server 150 generates a content-signing key, and the home PC 120 and the mobile information terminal 130 encrypts and decrypts the signing key based on the public-key cryptosystem.

Figure 11:
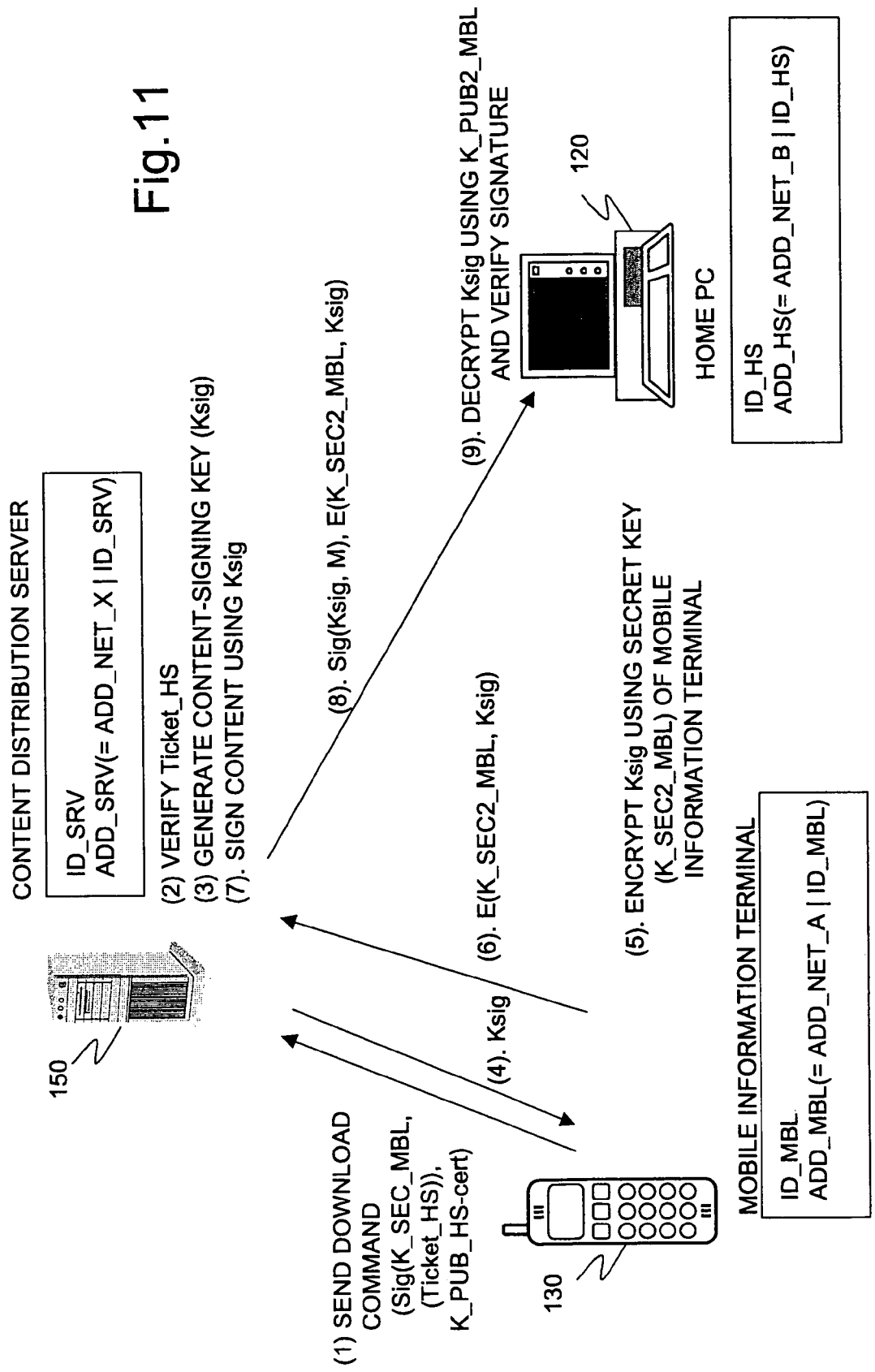
FIG. 11 is a diagram showing a processing sequence of a third example of content distribution process of the content distribution system according to the present invention.
Figure 12:
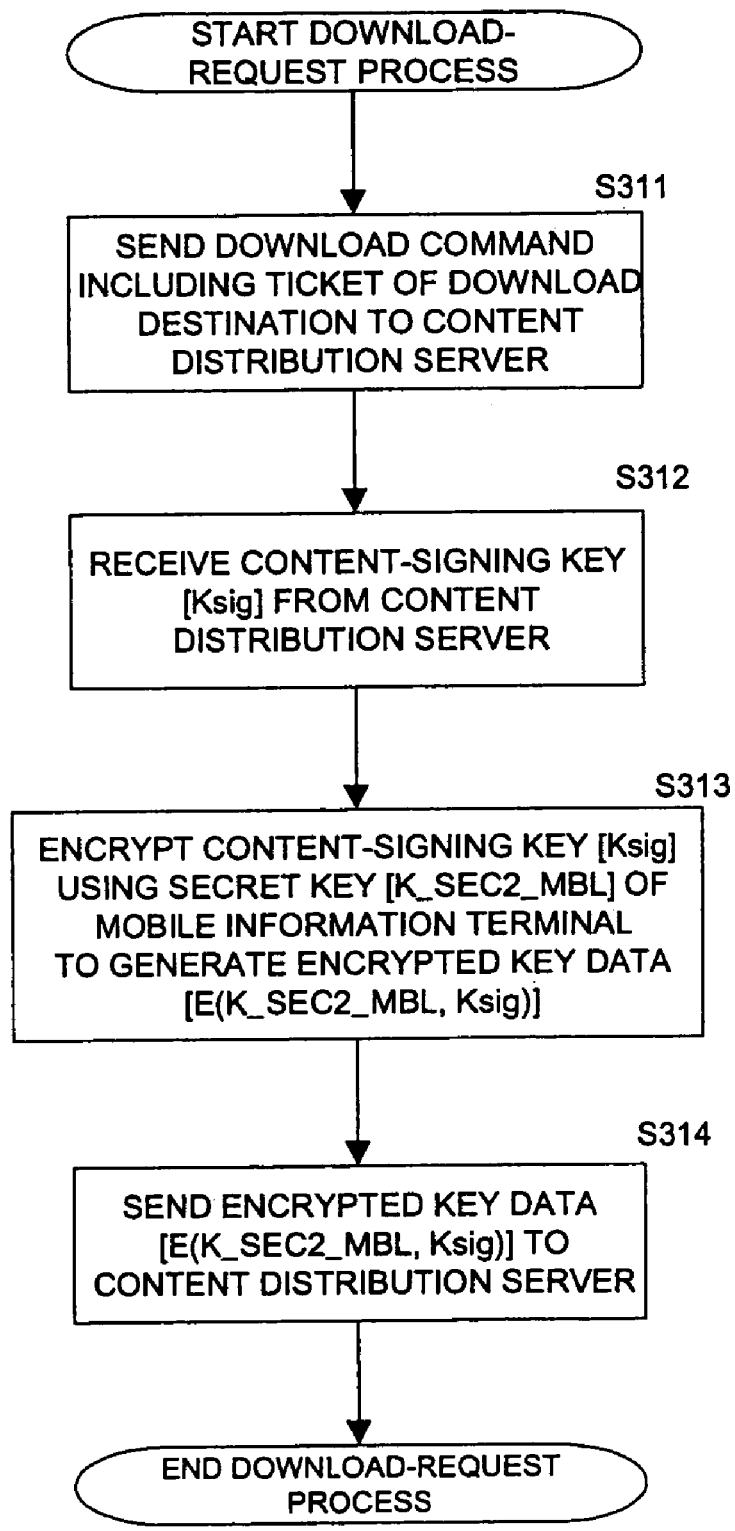
FIG. 12 is a diagram showing a flowchart of a process executed by a mobile information terminal that serves as a download-requesting device in the third example of content distribution process of the content distribution system according to the present invention.
Figure 13:
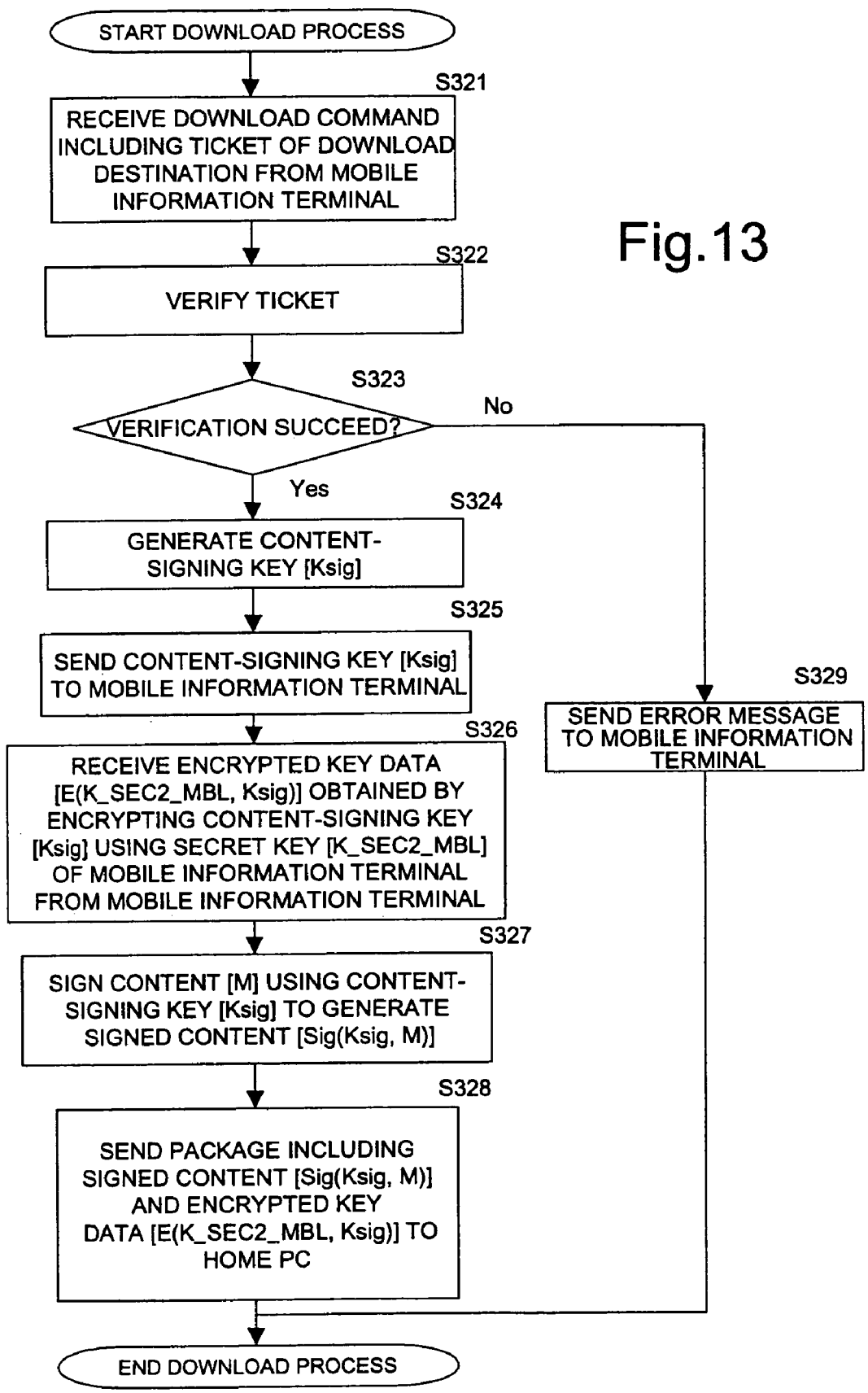
FIG. 13 is a diagram showing a flowchart of a process executed by a content distribution server in the third example of content distribution process of the content distribution system according to the present invention.
Figure 14:
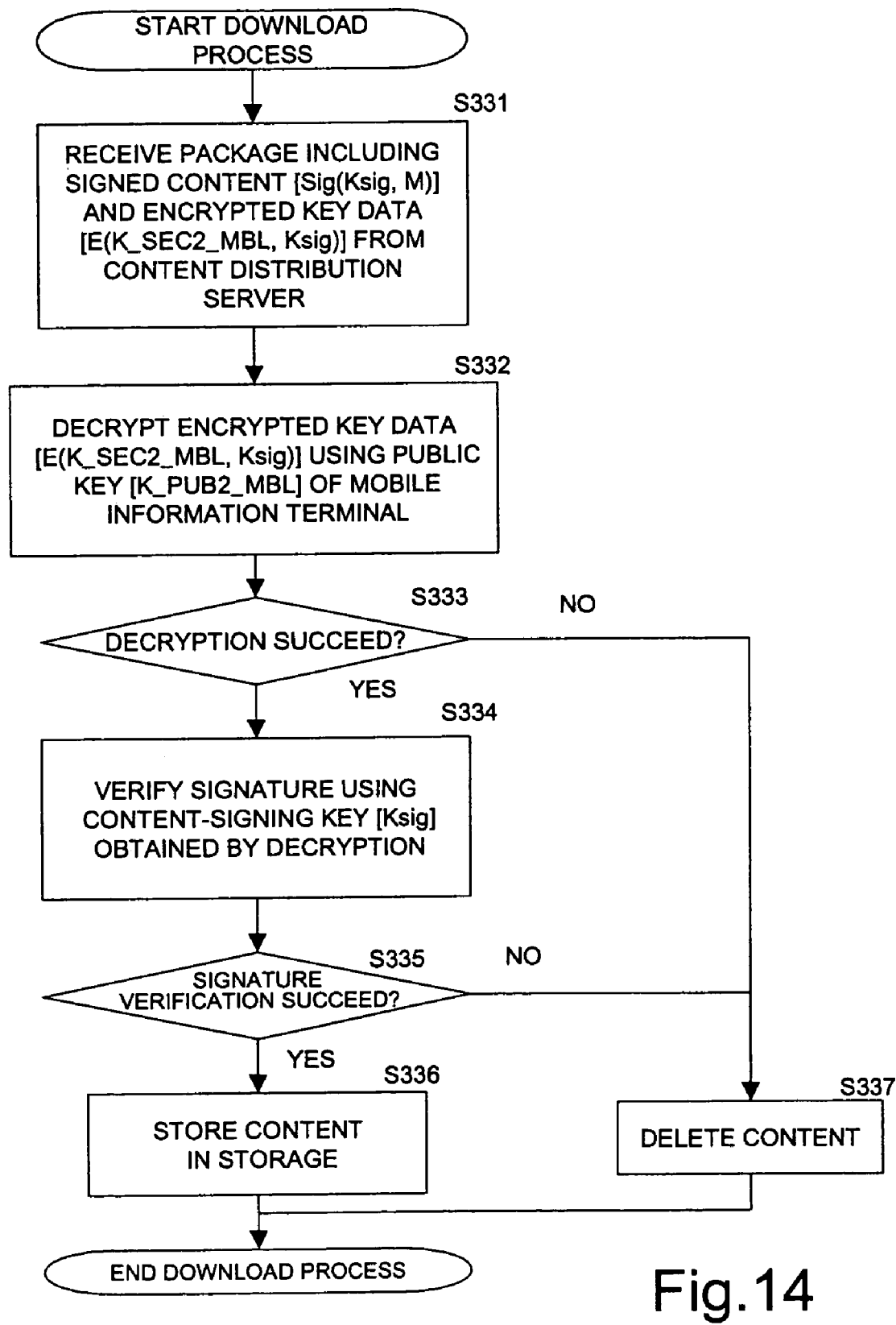
FIG. 14 is a diagram showing a flowchart of a process executed by a home PC that serves as a download-destination device in the third example of content distribution process of the content distribution system according to the present invention.

The third example of the content distribution process will be described with reference to FIGS. 11 to 14. FIG. 11 is a sequence diagram of a process executed among three parties, namely, a content distribution server, a mobile information terminal for accessing the content distribution server, and a home PC for downloading content according to a request from the mobile information terminal, the home PC having a home storage that serves as a large-capacity storage medium. FIG. 12 is a flowchart showing a process executed by the mobile information terminal. FIG. 13 is a flowchart showing a process executed by the content distribution server. FIG. 14 is a flowchart showing a process executed by the home PC.

The processes according to this embodiment will be described with reference to FIG. 11. The process proceeds in order from numbers (1) to (9) shown in FIG. 11. Each of the home PC 120 and the mobile information terminal 130 has a pair of public key and secret key of a public-key cryptosystem. That is, the home PC 120 has [K_PUB_HS] and [K_SEC_HS], and the mobile information terminal 130 has [K_PUB_MBL] and [K_SEC_MBL]. Furthermore, the home PC 120, i.e., a device that serves as a download destination, is assumed to have obtained the public key [K_PUB_MBL] of the mobile information terminal 130 that executes a download-request process.

First, in step (1), the mobile information terminal 130 issues to the content distribution server 150 a request for downloading content. The download request includes the home-pc ticket [Ticket_HS] received from a device that serves as a download destination, i.e., the home PC 120 herein, and a public-key certificate [K_PUB_HS-cert] including the public key of the home PC 120 serving as the download destination. The home-pc ticket [Ticket_HS] is data obtained by digitally signing the ID [ID_HS] of the home PC 120, the ID [ID_MBL] of the mobile information terminal 130, and the public key [K_PUB_HS] of the home PC 120 as a message, using the secret key [K_SEC_HS] of the home PC 120. That is, the home-pc ticket [Ticket_HS] is [Sig (K_SEC_HS, (ID_HS, ID_MBL, K_PUB_HS))].

The content distribution server 150, having received the home-PC ticket [Sig(K_SEC_MBL, (Ticket_HS))] and the public-key certificate [K_PUB_HS-cert] of the home PC 120 from the mobile information terminal 130, verifies the signature on the home-PC ticket [Sig(K_SEC_MBL, (Ticket_HS))] using the public key of the mobile information terminal 130, obtained from a public-key certificate of the mobile information terminal 130. In step (2), the content distribution server 150 verifies the home-pc ticket [Ticket_HS]. The procedure of the verification is the same as that in the first example process described earlier. If it is determined by the verification of the home-pc ticket [Ticket_HS] that the home-pc ticket [Ticket_HS] is a valid ticket that has not been tampered with, in step (3), the content distribution server 150 generates a content-signing key [Ksig]. This is a key for temporary use, and is generated, for example, based on a random number generated by a random number generator. Then, in step (4), the content distribution server 150 sends the content-signing key [Ksig] to the mobile information terminal 130.

In step (5), the mobile information terminal 130, having received the content-signing key [Ksig], encrypts the content-signing key [Ksig] using a second secret key [K_SEC2_MBL] of the mobile information terminal 130, thereby generating encrypted key data [E(K_SEC2_MBL, Ksig)]. The second secret key [K_SEC2_MBL] of the mobile information terminal 130 is a secret key constituting a second public-key pair that is different from the public-key pair used for the ticket. The second public-key pair is secret information that is shared only within the homenet area. The encryption of the content-signing key [Ksig] using the second secret key [K_SEC2_MBL] of the mobile information terminal 130 is based on a public-key cryptosystem, in which data encrypted using a secret key can be decrypted using a public key of the pair. Then, in step (6), the mobile information terminal 130 sends the encrypted key data [E(K_SEC2_MBL, Ksig)] to the content distribution server 150.

In step (7), the content distribution server 150 digitally signs content (M) to be downloaded, using the content-signing key [Ksig] generated earlier, thereby generating signed content data [Sig(Ksig, M)].

Then, in step (8), the content distribution server 150 sends the signed content data [Sig(Ksig, M)] and the encrypted key data [E(K_SEC2_MBL, Ksig)] received from the mobile information terminal 130 earlier in step (5) to the home PC 120 serving as the download destination.

Then, in step (9), the home PC 120, having received the signed content data [Sig(Ksig, M)] and the encrypted key data [E(K_SEC2_MBL, Ksig)], decrypts the encrypted key data [E(K_SEC2_MBL, Ksig)] using a public key [K_PUB2_MBL] of the mobile information terminal 130 that it owns, obtaining the content-signing key [Ksig], and verifies the signature on the signed content data [Sig(Ksig, M)]. The content is stored or played back on condition that the signature verification has proved that the data of the content (M) has not been tampered with.

Next, a process executed by the mobile information terminal 130, a process executed by the content distribution server 150, and a process executed by the home PC 120 will be described with reference to flowcharts shown in FIGS. 12 to 14, respectively.

First, the procedure of the process executed by the mobile information terminal 130 will be described with reference to the flowchart shown in FIG. 12. In step S311, the mobile information terminal 130 sends data including a device ticket of a device that serves as a download destination, i.e., the home-pc ticket [Ticket_HS] of the home PC 120 herein, to the content distribution server 150, thereby requesting downloading of content.

In step S312, the mobile information terminal 130 receives a content-signing key [Ksig] generated by the content distribution server 150.

In step S313, the mobile information terminal 130, having received the content-signing key [Ksig], encrypts the content-signing key [Ksig] using the secret key [K_SEC2_MBL] of the mobile information terminal 130, thereby generating encrypted key data [E(K_SEC2_MBL, Ksig)]. In step S314, the mobile information terminal 130 sends the encrypted key data [E(K_SEC2_MBL, Ksig)] to the content distribution server 150.

The process described above is executed by the mobile information terminal 130 in a content-download-request process executed between the mobile information terminal 130 and the content distribution server 150.

Next, a process executed by the content distribution server 150 that receives a content-download request from the mobile information terminal 130 will be described with reference to FIG. 13.

First, in step S321, the content distribution server 150 receives data including a device ticket of a download destination, i.e., the home-pc ticket [Ticket_HS] of the home PC 120 herein, from the mobile information terminal 130 as a download command.

In step S322, the content distribution server 150, having received the download command including the home-pc ticket [Ticket_HS] from the mobile information terminal 130, verifies the home-pc ticket [Ticket_HS]. As described earlier, the verification is executed by verifying the validity of the public-key certificate [K_PUB_HS-cert] of the home PC 120 by verifying a signature on the public-key certificate [K_PUB_HS-cert] (a signature of a certificate authority); obtaining the public key [K_PUB_HS] of the home PC 120 from the public-key certificate [K_PUB_HS-cert] whose validity has been verified; and verifying the signature on the home-pc ticket [Ticket_HS], i.e., [Sig(K_SEC_HS, (ID_HS, ID_MBL, K_PUB_HS))], using the public key [K_PUB_HS] of the home PC 120.

If it is determined in step S323 that the verification of the ticket has failed, the ticket, i.e., the home-pc ticket [Ticket_HS], has possibly been forged. Then, the process proceeds to step S129, in which an error message is sent to the mobile information terminal 130. The process is then exited. In this case, a content-download process is not executed.

If it is determined in step S323 that the verification of the ticket has succeeded, the process proceeds to step S324, in which a content-signing key [Ksig] is generated. Then, in step S325, the content-signing key [Ksig] is sent to the mobile information terminal 130.

Then, in step S326, the content distribution server 150 receives encrypted key data [E(K_SEC2_MBL, Ksig)] obtained by encrypting the content-signing key [Ksig] using the secret key [K_SEC2_MBL] of the mobile information terminal 130 from the mobile information terminal 130.

Then, in step S327, the content distribution server 150 digitally signs content (M) to be downloaded, using the content-signing key [Ksig] generated earlier, thereby generating singed content data [Sig(Ksig, M)].

Then, in step S328, the content distribution server 150 sends the singed content data [Sig(Ksig, M)] and the encrypted key data [E(K_SEC2_MBL, Ksig)] received earlier from the mobile information terminal 130 to the home PC 120 serving as the download destination.

The process described above is executed by the content distribution server 150 having received a content-download request from the mobile information terminal 130.

Next, a process executed by the home PC 120 to which content is downloaded from the content distribution server 150 will be described with reference to FIG. 14.

In step S331, the home PC 120 receives the signed content data [Sig(Ksig, M)] and the encrypted key data [E(K_SEC2_MBL, Ksig)] from the content distribution server 150.

In step S332, the home PC 120 decrypts the encrypted key data [E(K_SEC2_MBL, Ksig)] using the public key [K_PUB2_MBL] of the mobile information terminal 130 that it owns.

If the decryption fails in step S333, the homenet-area shared secret key [Ksec] could be illegitimate; for example, it differs from the key owned by the mobile information terminal 130. Then, the process proceeds to step S337, in which the content received is discarded.

If the decryption succeeds in step S333, the signature on the signed content data [Sig(Ksig, M)] is verified using the content-signing key [Ksig] obtained by the decryption. If the verification of the signature fails (No in S335), the content could have possibly been tampered with. Then, the process proceeds to step S337, in which the content received is discarded.

If the verification of the signature succeeds (Yes in S335), in step S336, the content received is stored in the storage of the home PC 120. The download process is then exited.

The process described above is executed by the home PC 120 that receives and downloads content from the content distribution server 150 having received a content-download request from the mobile information terminal 130.

As described above, according to this embodiment, the content distribution server 150 is allowed to verify a device ticket of a content-download destination, received from the mobile information terminal 130, and is therefore allowed to verify, based on a home-PC ticket transmitted from the mobile information terminal 130, that the home PC 120 is a download destination authorized by the mobile information terminal 130. That is, a content distribution server receives a ticket carrying a digital signature of a device that serves as a content-download destination from an information processing apparatus, e.g., a mobile information terminal, that requests downloading of content, and verifies the ticket. Thus, it is possible to verify that an information processing apparatus that serves as a content-download destination, e.g., a home PC, is a download destination authorized by the mobile information terminal. That is, it is possible to verify the authenticity of a device that serves as a download destination without directly authenticating the device serving as the download destination.

Furthermore, according to this embodiment, the content-signing key [Ksig] is encrypted using the secret key [K_SEC2_MBL] of the mobile information terminal 130, owned by the mobile information terminal 130. The result is transmitted from the mobile information terminal 130 via the content distribution server 150 to the home PC 120 that serves as a download destination, and is decrypted using the public key [K_PUB2_MBL] of the mobile information terminal 130, owned by the home PC 120, whereby the content-signing key [Ksig] is obtained. Thus, content can be downloaded securely using a secret key and a public key that is shared only within a homenet area without sharing the homenet-area shared secret key [Ksec] as in the first and second example processes described earlier.

[Fourth Example of Content Distribution Process]

Next, a fourth example of the content distribution process will be described. In the fourth example of the content distribution, the homenet-area shared secret key [Ksec] used in the first and second examples of the content distribution process is not used, and instead a pair of public key and secret key of an ordinary public-key cryptosystem is used. The content distribution server 150 calculates a hash value of content, encrypts the hash value using a secret key [K_SEC_MBL] of the mobile information terminal 130 that the mobile information terminal 130 owns, and sends the result from the mobile information terminal 130 via the content distribution server 150 to the home PC 120 that serves as a download destination.

Figure 15:
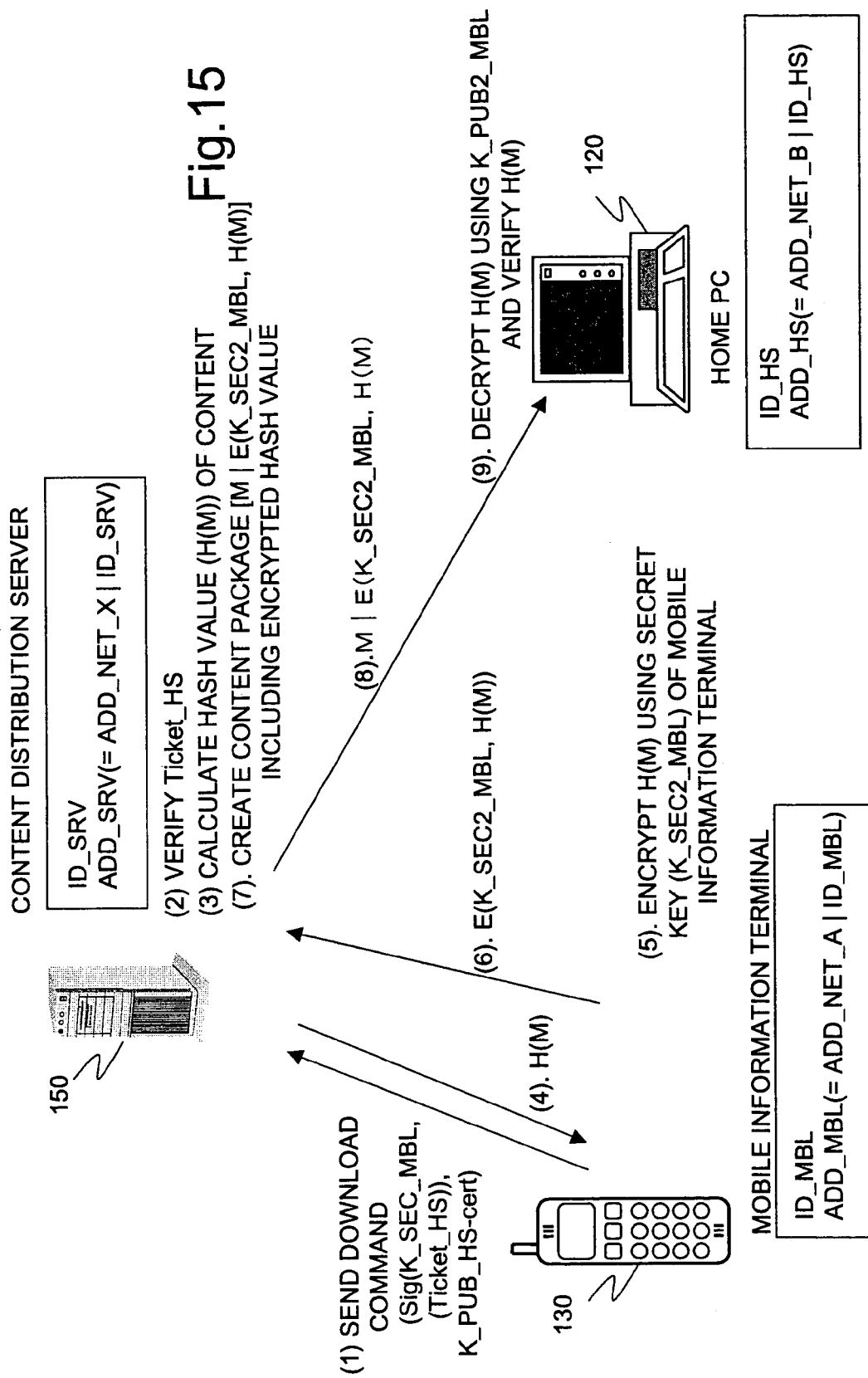
FIG. 15 is a diagram showing a processing sequence of a fourth example of content distribution process of the content distribution system according to the present invention.
Figure 16:
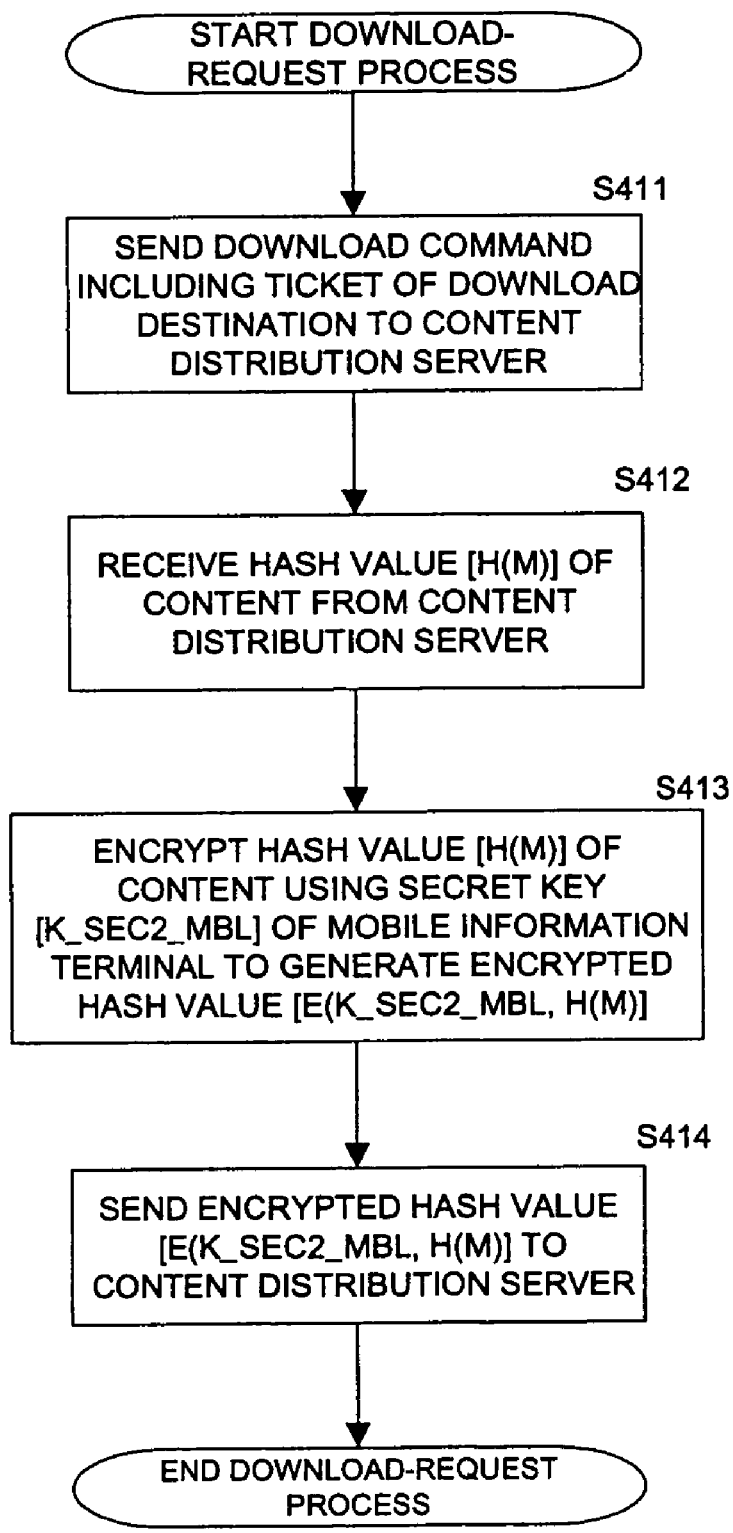
FIG. 16 is a diagram showing a flowchart of a process executed by a mobile information terminal that serves as a download-requesting device in the fourth example of content distribution process of the content distribution system according to the present invention.
Figure 17:
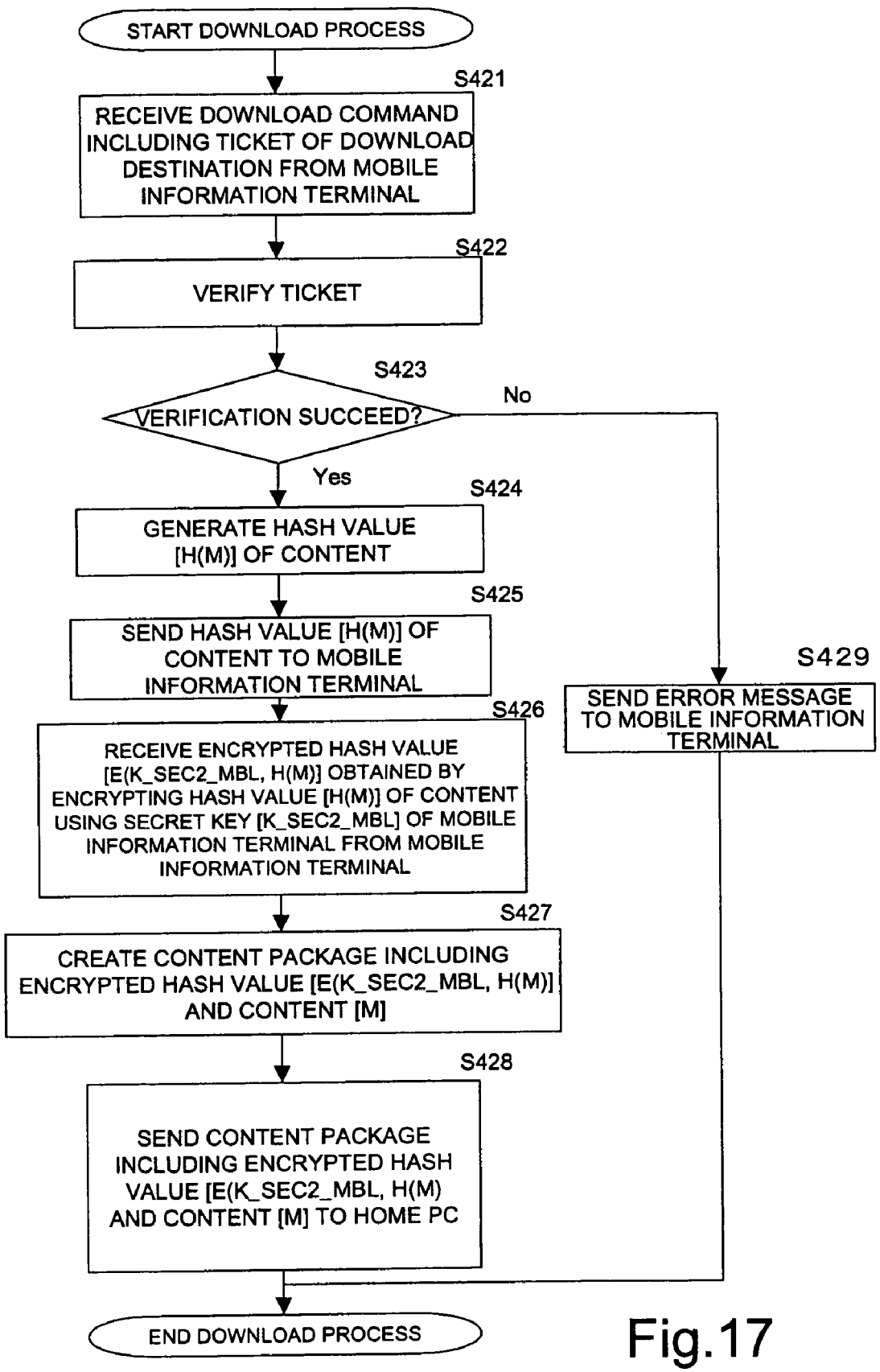
FIG. 17 is a diagram showing a flowchart of a process executed by a content distribution server in the fourth example of content distribution process of the content distribution system according to the present invention.
Figure 18:
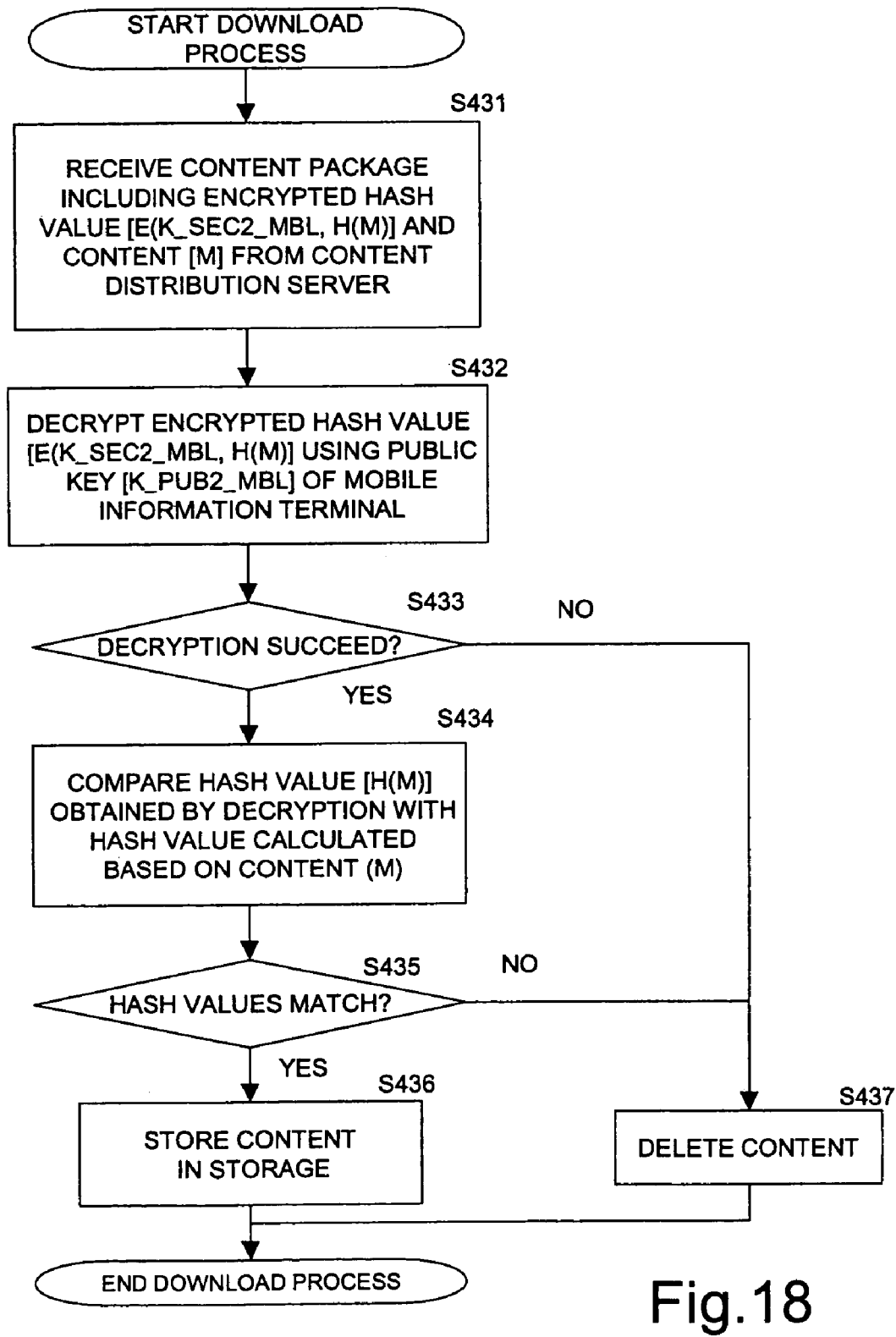
FIG. 18 is a diagram showing a flowchart of a process executed by a home PC that serves as a download-destination device in the fourth example of content distribution process of the content distribution system according to the present invention.

The fourth example of the content distribution process will be described with reference to FIGS. 15 to 18. FIG. 15 is a sequence diagram showing processes executed among three parties, namely, a content distribution server, a mobile information terminal for accessing the content distribution server, and a home PC for downloading content according to a request from the mobile information terminal, the home PC having a home storage that serves as a large-capacity storage medium. FIG. 16 is a flowchart showing a process executed by the mobile information terminal. FIG. 17 is a flowchart showing a process executed by the content distribution server. FIG. 18 is a flowchart showing a process executed by the home PC.

The process according to this embodiment will be described with reference to FIG. 15. The process proceeds in order from numbers (1) to (9) shown in FIG. 15.

First, in step (1), the mobile information terminal 130 issues to the content distribution server 150 a request for downloading content. The download request includes the home-pc ticket [Ticket_HS] of a device that serve as a download destination, i.e., the home PC 120 herein, and a public-key certificate [K_PUB_HS-cert] including a public key of the home PC 120 serving as the download destination. The home-pc ticket [Ticket_HS] is data obtained by digitally signing the ID [ID_HS] of the home PC 120, the ID [ID_MBL] of the mobile information terminal 130, and the public key [K_PUB_HS] of the home PC 120 as a message, using the secret key [K_SEC_HS] of the home PC 120. That is, the home-pc ticket [Ticket_HS] is [Sig(K_SEC_HS, (ID_HS, ID_MBL, K_PUB_HS))].

The content distribution server 150, having received the home-PC ticket [Sig(K_SEC_MBL, (Ticket_HS))] and the public-key certificate [K_PUB_HS-cert] of the home PC 120, verifies the signature on the home-PC ticket [Sig(K_SEC_MBL, (Ticket_HS))] using a public key of the mobile information terminal 130, obtained from a public-key certificate of the mobile information terminal 130. In step (2), the content distribution server 150 verifies the home-pc ticket [Ticket_HS]. The procedure of the verification includes (a) verifying the validity of the public-key certificate [K_PUB_HS-cert] of the home PC 120 by verifying a signature on the public-key certificate [K_PUB_HS-cert] (a signature of a certificate authority); (b) obtaining the public key [K_PUB_HS] of the home PC 120 from the public-key certificate [K_PUB_HS-cert] whose validity has been verified; and (c) verifying the signature on the home-pc ticket [Ticket_HS], i.e., [Sig(K_SEC_HS, (ID_HS, ID_MBL, K_PUB_HS))], using the public key [K_PUB_HS] of the home PC 120.

If it is verified by the procedure, i.e., the verification of the home-pc ticket [Ticket_HS], that the home-pc ticket [Ticket_HS] is a valid ticket that has not been tampered with, in step (3), the content distribution server 150 calculates a hash value [H(M)] of the content. Then, in step (4), the content distribution server 150 sends the hash value [H(M)] of the content to the mobile information terminal 130.

In step (5), the mobile information terminal 130, having received the hash value [H(M)] of the content, encrypts the hash value [H(M)] of the content using a second secret key [K_SEC2_MBL] of the mobile information terminal 130, thereby generating an encrypted hash value [E(K_SEC2_MBL, H(M))]. In step (6), the mobile information terminal 130 sends the encrypted hash value [E(K_SEC2_MBL, H(M))] to the content distribution server 150. The second secret key [K_SEC2_MBL] of the mobile information terminal 130 is a secret key constituting a second public-key pair that is different from the public-key pair used for the ticket. The second public-key pair is secret information that is shared only within the homenet area.

In step (7), the content distribution server 150 generates a content package [M|E(K_SEC2_MBL, H(M))] including the encrypted hash value [E(K_SEC2_MBL, H(M))] and the content (M). In step (8), the content distribution server 150 sends the content package [M|E(K_SEC2_MBL, H(M))] to the home PC 120 serving as the download destination.

Then, in step (9), the home PC 120, having received the content package [M|E(K_SEC2_MBL, H(M))], decrypts the encrypted hash value [E(K_SEC2_MBL, H(M))] included in the content package [M|E(K_SEC2_MBL, H(M))], using the public key [K_PUB2_MBL] of the mobile information terminal 130 that it owns, thereby obtaining the content-signing key [Ksig] and obtaining the hash value [H(M)] of the content. Furthermore, the home PC 120 calculates a hash value of the content (M), and checks matching of the two hash values. If the hash values match, it is determined that the content has not been tampered with. If the hash values do not match, it is determined that the content has been tampered with. The content is stored or played back on condition that the verification has proved that the data of the content (M) has not been tampered with.

Next, a process executed by the mobile information terminal 130, a process executed by the content distribution server 150, and a process executed by the home PC 120 will be described with reference to flowcharts shown in FIGS. 16 to 18, respectively.

First, the procedure of the process executed by the mobile information terminal 130 will be described with reference to the flowchart shown in FIG. 16. In step S411, the mobile information terminal 130 sends a device ticket of a device that serves as a download destination, i.e., the home-pc ticket [Ticket_HS] of the home PC 120 herein, to the content distribution server 150, thereby requesting downloading of content.

In step S412, the mobile information terminal 130 receives a hash value [H(M)] of the content, generated by the content distribution server 150.

In step S413, the mobile information terminal 130, having received the hash value [H(M)] of the content, encrypts the hash value [H(M)] of the content using the second secret key [K_SEC2_MBL] of the mobile information terminal 130, thereby generating an encrypted hash value [E(K_SEC2_MBL, H(M))]. In step S414, the mobile information terminal 130 sends the encrypted hash value [E(K_SEC2_MBL, H(M))] to the content distribution server 150.

The process described above is executed by the mobile information terminal 130 in a content-download-request process executed between the mobile information terminal 130 and the content distribution server 150.

Next, a process executed by the content distribution server 150 that receives a content-download-request command from the mobile information terminal 130 will be described with reference to FIG. 17.

First, in step S421, the content distribution server 150 receives data including a device ticket of a download destination, i.e., the home-pc ticket [Ticket_HS] of the home PC 120 herein, from the mobile information terminal 130 as a download command.

In step S422, the content distribution server 150, having received the download command including the home-pc ticket [Ticket_HS] from the mobile information terminal 130, verifies the home-pc ticket [Ticket_HS]. The verification process is the same as that described earlier.

If it is determined in step S423 that the verification of the ticket has failed, the ticket, i.e., the home-pc ticket [Ticket_HS], has possibly been forged. Then, the process proceeds to step S429, in which an error message is sent to the mobile information terminal 130. The process is then exited. In this case, a content-download process is not executed.

If it is determined in step S423 that the verification of the ticket has succeeded, the process proceeds to step S424, in which a hash value [H(M)] of the content is generated. Then, in step S425, the hash value [H(M)] of the content is sent to the mobile information terminal 130.

Then, in step S426, the content distribution server 150 receives an encrypted hash value [E(K_SEC2_MBL, H(M))] obtained by encrypting the hash value [H(M)] of the content using the secret key [K_SEC2_MBL] of the mobile information terminal 130 from the mobile information terminal 130.

Then, in step S427, the content distribution server 150 creates a content package [M|E(K_SEC2_MBL, H(M))] including the encrypted hash value [E(K_SEC2_MBL, H(M))] received from the mobile information terminal 130 and the content (M).

Then, in step S428, the content distribution server 150 sends the content package [M|E(K_SEC2_MBL, H(M))] to the home PC 120 serving as the download destination.

The process described above is executed by the content distribution server 150 that has received a content-download request from the mobile information terminal 130.

Next, a process executed by the home PC 120 to which content is downloaded from the content distribution server 150 will be described with reference to FIG. 18.

In step S431, the home PC 120 receives the content package [M|E(K_SEC2_MBL, H(M))] from the content distribution server 150.

In step S432, the home PC 120 decrypts the encrypted hash value [E(K_SEC2_MBL, H(M))] included in the content package [M|E(K_SEC2_MBL, H(M))], using the public key [K_PUB2_MBL] of the mobile information terminal 130 that it owns.

If the decryption fails in step S433, the public key [K_PUB2_MBL] of the mobile information terminal 130 owned by the home PC 120 could be illegitimate; for example, it differs from a public key constituting a pair with the secret key owned by the mobile information terminal 130. Then, the process proceeds to step S437, in which the content received is discarded.

If the decryption succeeds in step S433, the hash value [H(M)] of the content, obtained by the decryption, is compared with a hash value H(M)' calculated based on the content (M). If the hash values compared do not match (No in S435), the content could have possibly been tampered with. Then, the process proceeds to step S437, in which the content received is discarded.

If the hash values match (Yes in S435), in step S436, the content received is stored in the storage of the home PC 120. The process is then exited.

The process described above is executed by the home PC 120 that receives and downloads content from the content distribution server 150 having received a content-download request from the mobile information terminal 130.

As described above, according to this embodiment, the content distribution server 150 is allowed to verify a device ticket of a content-download destination, received from the mobile information terminal 130, and is therefore allowed to verify, based on a home-PC ticket transmitted from the mobile information terminal 130, that the home PC 120 is a download destination authorized by the mobile information terminal 130. That is, a content distribution server receives a ticket carrying a signature of a device that serves as a content-download destination from an information processing apparatus, e.g., a mobile information terminal, that issues a content-download request, and verifies the ticket. Thus, it is possible to verify that an information processing apparatus that serves as a download destination, e.g., a home-PC, is a download destination authorized by the mobile information terminal. That is, it is possible to verify the authenticity of a device that serves as a download destination without directly authenticating the device serving as the download destination.

Furthermore, according to this embodiment, a hash value [H(M)] of content is encrypted using the second secret key [K_SEC2_MBL] of the mobile information terminal 130. The result is transmitted from the mobile information terminal 130 via the content distribution server 150 to the home PC 120 that serves as a download destination, and is decrypted using the public key [K_PUB2_MBL] of the mobile information terminal 130 owned by the home PC 120, whereby the hash value [H(M)] of the content is obtained, which is compared with a hash value calculated by the home PC 120 based on the content. Accordingly, content can be downloaded securely using a secret key and a public key that is shared only within a homenet area without sharing the homenet-area shared secret key [Ksec] as in the first and second example processes described earlier.

[Example Configurations of Information Processing Apparatuses and Server]

Figure 19:
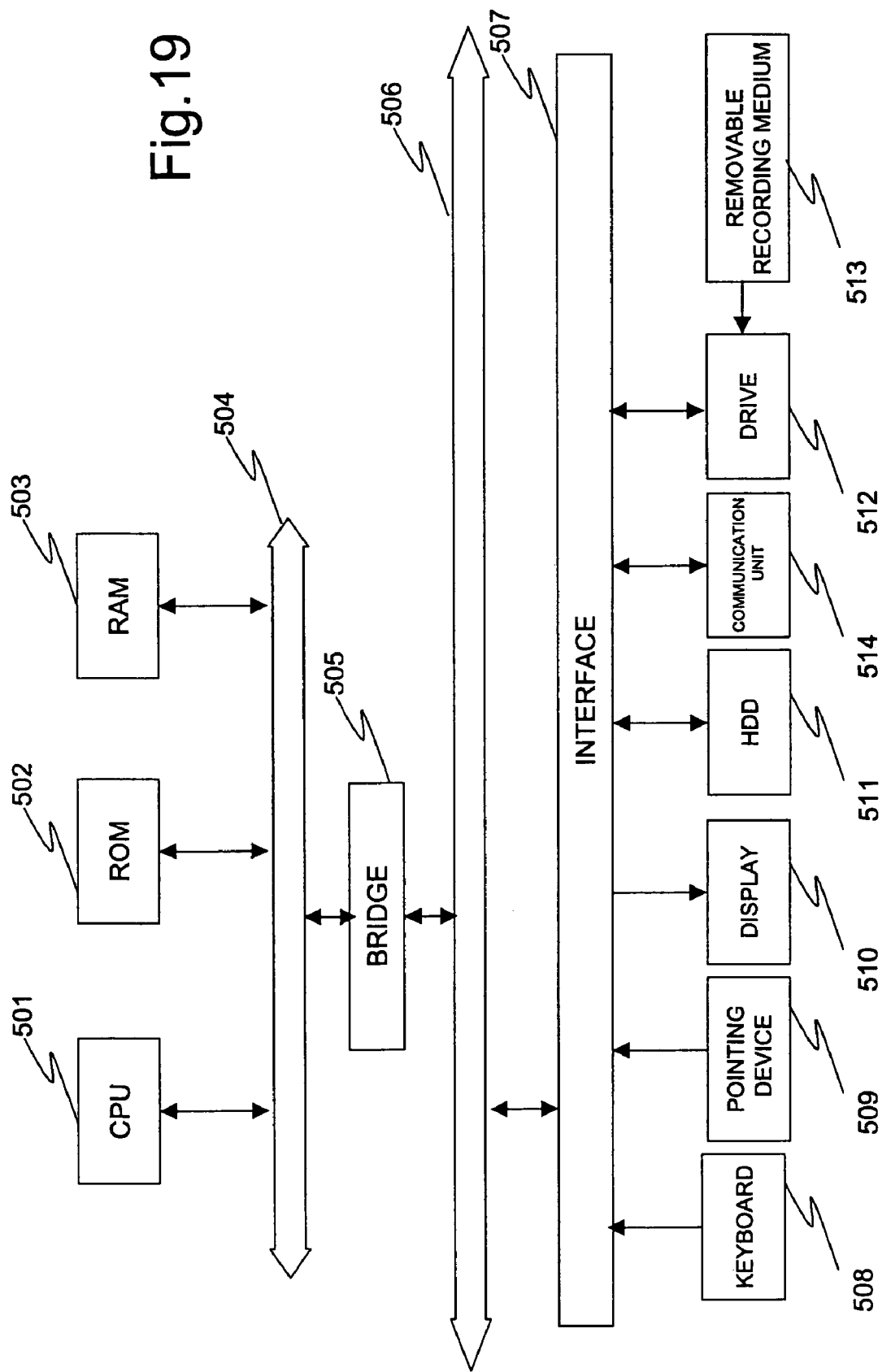
FIG. 19 is a diagram showing an example configuration of an information processing apparatus such as a home PC or a mobile information terminal in the content distribution system according to the present invention.
Figure 20:
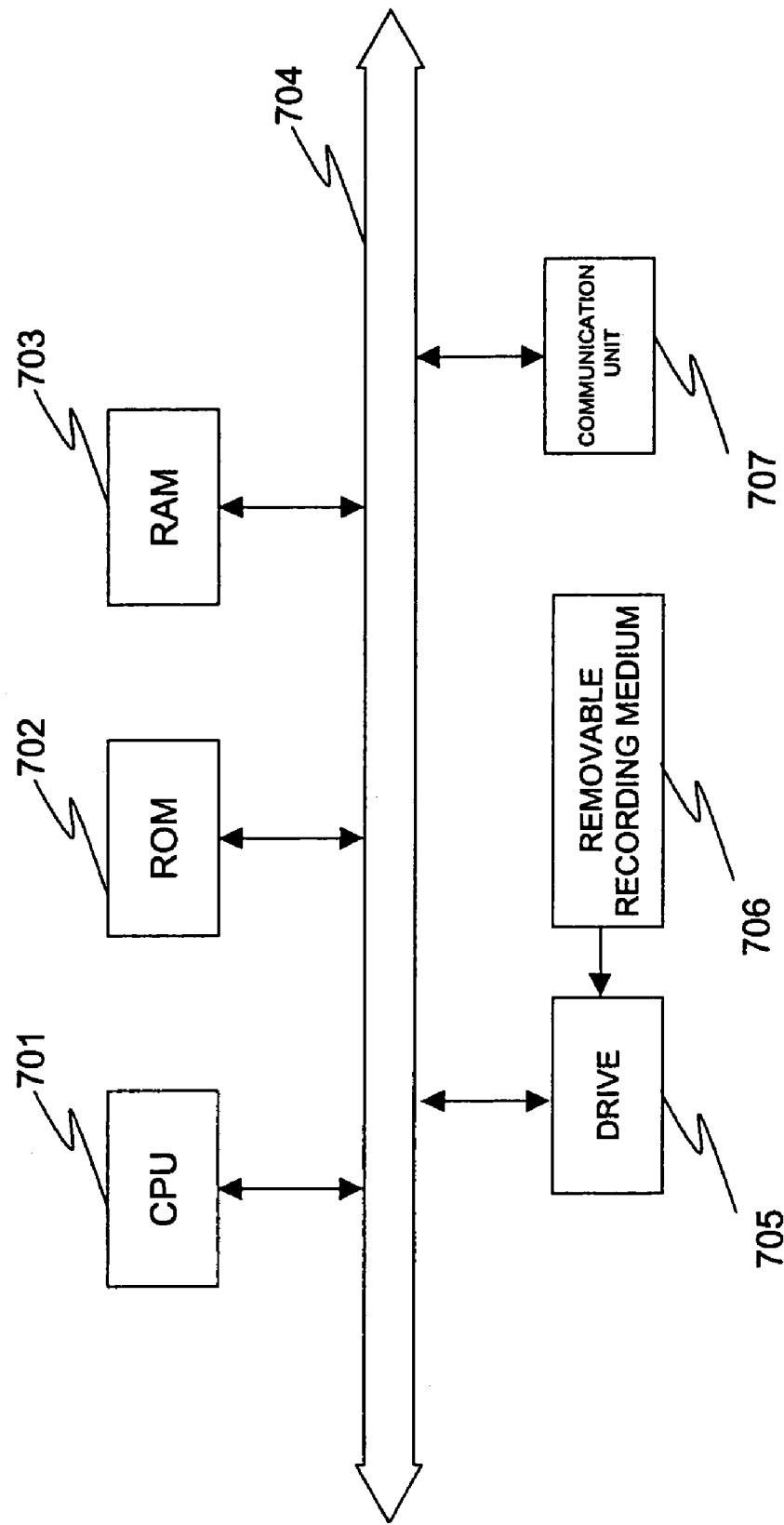
FIG. 20 is a diagram showing an example configuration of a content distribution server in the content distribution system according to the present invention.

Next, example configurations of information processing apparatuses that serve as the home PC 120 and the mobile information terminal 130, and of the content distribution server 150 will be described with reference to FIGS. 19 and 20. FIG. 19 shows an example configuration of an information processing apparatus that serve as the home PC 120 or the mobile information terminal 130.

A CPU (central processing unit) 501 is a processing unit for executing various application programs and an OS (operating system). A ROM (read-only-memory) 502 stores programs executed by the CPU 501, and fixed data that serves as processing parameters. A RAM (random access memory) 503 is used as a work area, i.e., an area for storing programs executed by the CPU 501 and parameters that change in the course of the programs.

A host bus 504 is connected to an external bus 506, such as a PCI (Peripheral Component Internet/Interface) bus, via a bridge 505.

A keyboard 508 is operated by a user to input various commands to the CPU 501. A pointing device 509 is operated by a user when, for example, specifying a position on a screen of a display 510 or specifying a command. The display 510 is, for example, a CRT display or a liquid crystal display, and it displays various information in the form of text, image, etc. An HDD (hard disk drive) 511 drives a hard disk that serves as in information storage medium to read programs and data from the hard disk or to write programs and data to the hard disk.

A drive 512 is used for recording on or playback from a removable recording medium 513 such as a floppy disc, a CD-ROM (compact disc read only memory), an MO (magneto optical) disk, a DVD (digital versatile disc), a magnetic disc, or a semiconductor memory. The drive 512 plays back programs or data from the removable recording medium 513, or stores programs or data on the removable recording medium 513.

When a program or data recorded on the storage medium is read and executed or processed by the CPU 501, the program or data that has been read is supplied, for example, to the RAM 503 that is connected via an interface 507, the external bus 506, the bridge 505, and the host bus 504.

The keyboard 508 to the drive 512 are connected to the interface 507, and the interface 507 is connected to the CPU 501 via the external bus 506, the bridge 505, and the host bus 504.

A communication unit 514 carries out communications with a server apparatus via a router or the like that is connected to the information processing apparatus. The communication unit 514 sends packets including data supplied from the CPU 501, the HDD 511, etc., and also receives packets via the router. The communication unit 503 is connected to the CPU 501 via the external bus 506, the bridge 505, and the host bus 504.

Next, the configuration of a server apparatus that distributes content will be described with reference to FIG. 20.

A CPU (central processing unit) 701 is a processing unit for executing various application programs and an OS (operating system). A ROM (read-only-memory) 702 stores programs executed by the CPU 701 and fixed data that serves as processing parameters. A RAM (random access memory) 703 is used as a work area, i.e., an area for storing programs executed by the CPU 701 and parameters that change in the course of the programs.

A drive 705 is used for recording on or playback from a removable recording medium 706 such as a floppy disc, a CD-ROM (compact disc read only memory), an MO (magneto optical) disc, a DVD (digital versatile disc), a magnetic disc, or a semiconductor memory. The drive 705 plays back programs or data from the removable recording medium 706, or stores programs or data on the removable recording medium 706. When a program or data recorded on the storage medium is read and executed or processed by the CPU 701, the program or data that has been read is supplied, for example, to the RAM 703 or a communication unit 707 that is connected via a bus 704.

The communication unit 707 carries out communications with a communication terminal such as a mobile information terminal. The communication unit 707 sends packets created by data processing executed by the CPU 701, and also receives packets via the Internet.

The CPU 701 to the communication unit 707 are connected to each other via the bus 704, allowing transfer of data.

Hereinabove, the present invention has been described in detail in the context of specific embodiments. However, it is apparent that modifications of and alternatives to the embodiments can be conceived by those skilled in the art without departing from the spirit of the present invention. That is, the present invention has been disclosed by way of examples, and the disclosure should not be construed as limiting. The spirit of the present invention should be determined by Claims given at the beginning.

The series of processes described in this specification can be executed either by hardware or by software, or by combination thereof. When the processes are executed by software, a program including the processing sequence is installed and executed in a memory of a computer embedded in special hardware, or the program is installed and executed on a general-purpose computer that is capable of executing various processes.

For example, the program may be recorded in advance on a hard disk or a ROM (read only memory) that serves as a recording medium. Alternatively, the program may be temporarily or permanently stored (recorded) on a removable recording medium such as a floppy disc, a CD-ROM (compact disc read only memory), an MO (magneto optical) disc, a DVD (digital versatile disc), a magnetic disc, or a semiconductor memory. The removable recording medium can be provided in the form of what is called package software.

Instead of installing the program from the removable recording medium to a computer as described above, the program may be transferred from a downloading site to a computer by wireless, or through wired lines via a network such as a LAN (local area network) or the Internet, so that the program transferred can be received by the computer and installed on an internal recording medium such as a hard disk.

The various processes described in this specification may be executed in parallel or individually, depending on the processing ability of devices that execute the processes, or as required, instead of being executed sequentially in the order described.

INDUSTRIAL APPLICABILITY

As described hereinabove, according to the present invention, a content distribution server receives a ticket carrying a signature of a device that serves as a content-download destination from an information processing apparatus, e.g., a mobile information terminal, that issues a content-download request, and verifies the ticket. Thus, it is possible to verify that an information processing apparatus that serves as a content-download destination, e.g., a home PC, is a download destination authorized by the mobile information terminal. That is, it is possible to verify the authenticity of a device that serves as a download destination without directly authenticating the device serving as the download destination.

Furthermore, according to an embodiment of the present invention, a content-signing key [Ksig] is encrypted using a homenet-area shared secret key [Ksec] shared by an information processing apparatus that issues a content-download request, e.g., a mobile information terminal, and an information processing apparatus that serves as a content-download destination, e.g., a home PC. The result is transmitted from the information processing apparatus that issues a content-download request, e.g., the mobile information terminal, to the information processing apparatus serving as the download destination, e.g., the home PC, and is decrypted using the homenet-area shared secret key [Ksec] owned by the home PC, whereby the content-signing key [Ksig] is obtained. Thus, the content-signing key [Ksig] can be obtained at the home PC serving as the download destination on condition that the information processing apparatus that issues a content-download request, e.g., the mobile information terminal, and the information processing apparatus serving as the download destination, e.g., the home PC, share the same homenet-area shared secret key [Ksec]. Accordingly, valid content can be verified and downloaded only among devices that share the same homenet-area shared secret key [Ksec]. This serves to prevent storage of invalid content.

Furthermore, according to an embodiment of the present invention, a hash value [H(M)] of content is encrypted using a homenet-area shared secret key [Ksec] shared by an information processing apparatus that issues a content-download request, e.g., a mobile information terminal, and an information processing apparatus that serves as a content-download destination, e.g., a home PC. The result is transmitted from the information processing apparatus that issues a content-download request, e.g., the mobile information terminal, to the information processing apparatus serving as the download destination, e.g., the home PC, and is decrypted using the homenet-area shared secret key [Ksec] owned by the home PC, whereby the hash value [H(M)] of the content is obtained, which is compared with a hash value calculated by the home PC based on the content. Accordingly, valid content can be verified and downloaded only among devices that share the same homenet-area shared secret key [Ksec]. This serves to prevent storage of invalid content.

Furthermore, according to an embodiment of the present invention, a content-signing key [Ksig] or a hash value [H(M)] of content is encrypted using a secret key [K_SEC_MBL] of a device that issues a content-download request, e.g., a mobile information terminal. The result is transmitted from the mobile information terminal via a content distribution server to a home PC that serves as a download destination, and is decrypted using a public key [K_PUB_MBL] of the mobile information terminal that is owned by the home PC, whereby the content-signing key [Ksig] or the hash value [H(M)] of the content is obtained, with which the content is verified. Accordingly, content can be downloaded securely using a public key and a secret key of an ordinary public-key cryptosystem without sharing a homenet-area shared secret key [Ksec].

The invention claimed is:

1. A content distribution system comprising:
a first information processing apparatus configured to issue a content-download request in which a download destination that is different from the first information processing apparatus itself is specified;
a second information processing apparatus that is specified as a download destination of content; and
a content distribution server configured to receive the content-download request from the first information processing apparatus and send the content to the second information processing apparatus,
wherein the first information processing apparatus sends a ticket carrying a digital signature of the second information processing apparatus to the content distribution server to authenticate that the second information processing apparatus is authorized to receive the content from the content distribution server, and
the content distribution server verifies the digital signature on the ticket, and on condition that the verification has succeeded, the content distribution server determines that the second information processing apparatus is a content-download destination authorized by the first information processing apparatus, and sends the content to the second information processing apparatus.

2. The content distribution system according to claim 1,
wherein the first information processing apparatus and the second information processing apparatus have a homenet-area shared secret key [Ksec] that serves as a shared secret key,
the first information processing apparatus sends encrypted key data [E(Ksec, Ksig)] to the second information processing apparatus via the content distribution server, the encrypted key data [E(Ksec, Ksig)] being obtained by encrypting, using the homenet-area shared secret key [Ksec], a content-signing key [Ksig] generated by the content distribution server, and
the second information processing apparatus verifies a signature on the content received from the content distribution server, using the content-signing key [Ksig] obtained by decrypting the encrypted key data [E(Ksec, Ksig)] using the homenet-area shared secret key [Ksec].

3. The content distribution system according to claim 1,
wherein the first information processing apparatus and the second information processing apparatus have a homenet-area shared secret key [Ksec] that serves as a shared secret key,
the first information processing apparatus sends an encrypted hash value [E(Ksec, H(M))] to the second information processing apparatus via the content distribution server, the encrypted hash value [E(Ksec, H(M))] being obtained by encrypting, using the homenet-area shared secret key [Ksec], a hash value [H(M)] of the content, generated by the content distribution server, and
the second information processing apparatus verifies the content received from the content distribution server, using the hash value [H(M)] of the content, obtained by decrypting the encrypted hash value [E(Ksec, H(M))] using the homenet-area shared secret key [Ksec].

4. The content distribution system according to claim 1,
wherein each of the first information processing apparatus and the second information processing apparatus has a public key and a secret key of a public-key cryptosystem,
the first information processing apparatus sends encrypted key data [E(K_SEC_MBL, Ksig)] to the second information processing apparatus via the content distribution server, the encrypted key data [E(K_SEC_MBL, Ksig)] being obtained by encrypting, using the secret key [K_SEC_MBL] of the first information processing apparatus, a content-signing key [Ksig] generated by the content distribution server, and
the second information processing apparatus verifies a signature on the content received from the content distribution server, using the content-signing key [Ksig] obtained by decrypting the encrypted key data [E(K_SEC_MBL, Ksig)] using the public key [K_PUB_MBL] of the first information processing apparatus.

5. The content distribution system according to claim 1,
wherein each of the first information processing apparatus and the second information processing apparatus has a public key and a secret key of a public-key cryptosystem,
the first information processing apparatus sends an encrypted hash value [E(K_SEC_MBL, H(M))] to the second information processing apparatus via the content distribution server, the encrypted hash value [E(K_SEC_MBL, H(M))] being obtained by encrypting, using the secret key [K_SEC_MBL] of the first information processing apparatus, a hash value [H(M)] of the content, generated by the content distribution server, and
the second information processing apparatus verifies a signature on the content received from the content distribution server, using the hash value [H(M)] of the content, obtained by decrypting the encrypted hash value [E(K_SEC_MBL, H(M))] using the public key [K_PUB_MBL] of the first information processing apparatus.

6. The content distribution system according to claim 1,
wherein the ticket is obtained by applying a digital signature on data including respective identifiers (IDs) of the first information processing apparatus and the second information processing apparatus, using a secret key of the second information processing apparatus, and
the content distribution server verifies the digital signature on the ticket using a public key of the second information processing apparatus.

7. The content distribution system according to claim 1, wherein the content distribution server verifies the digital signature on the ticket by:
(a) verifying the validity of a public-key certificate of the second information processing apparatus by verifying a signature on the public-key certificate (a signature of a certificate authority),
(b) obtaining a public key of the second information processing apparatus from the public-key certificate whose validity has been verified, and
(c) verifying the signature on the ticket of the second information processing apparatus using the public key of the second information processing apparatus.

8. A content distribution method for a content distribution system:
at a first information processing apparatus configured to issue a content-download request in which a download destination that is different from the first information processing apparatus itself is specified, sending, by the first information processing apparatus, a ticket carrying a digital signature of a second information processing apparatus to a content distribution server to authenticate that the second information processing apparatus is authorized to receive the content from the content distribution server, the second information processing apparatus being specified as a download destination of the content; and at the content distribution server configured to receive the content-download request from the first information processing apparatus and to send the content to the second information processing apparatus, verifying the digital signature on the ticket, determining, on condition that the verification has succeeded, that the second information processing apparatus is a content-download destination authorized by the first information processing apparatus, and sending the content to the second information processing apparatus.

9. The content distribution method according to claim 8, wherein the first information processing apparatus sends encrypted key data [E(Ksec, Ksig)] to the second information processing apparatus via the content distribution server, the encrypted key data [E(Ksec, Ksig)] being obtained by encrypting, using a homenet-area shared secret key [Ksec] that serves as a secret key shared by the first information processing apparatus and the second information processing apparatus, a content-signing key [Ksig] generated by the content distribution server, and the second information processing apparatus verifies a signature on the content received from the content distribution server, using the content-signing key [Ksig] obtained by decrypting the encrypted key data [E(Ksec, Ksig)] using the homenet-area shared secret key [Ksec].

10. The content distribution method according to claim 8, wherein the first information processing apparatus sends an encrypted hash value [E(Ksec, H(M))] to the second information processing apparatus via the content distribution server, the encrypted hash value [E(Ksec, H(M))] being obtained by encrypting, using a homenet-area shared secret key [Ksec] that serves as a secret key shared by the first information processing apparatus and the second information processing apparatus, a hash value [H(M)] of the content, generated by the content distribution server, and the second information processing apparatus verifies the content received from the content distribution server, using the hash value [H(M)] of the content, obtained by decrypting the encrypted hash value [E(Ksec, H(M))] using the homenet-area shared secret key [Ksec].

11. The content distribution method according to claim 8, wherein the first information processing apparatus sends encrypted key data [E(K_SEC_MBL, Ksig)] to the second information processing apparatus via the content distribution server, the encrypted key data [E(K_SEC_MBL Ksig)] being obtained by encrypting, using a secret key [K_SEC_MBL] of the first information processing apparatus, a content-signing key [Ksig] generated by the content distribution server, and the second information processing apparatus verifies a signature on the content received from the content distribution server, using the content-signing key [Ksig] obtained by decrypting the encrypted key data [E(K_SEC_MBL, Ksig)] using a public key [K_PUB_MBL] of the first information processing apparatus.

12. The content distribution method according to claim 8, wherein the first information processing apparatus sends an encrypted hash value [E(K_SEC_MBL, H(M))] to the second information processing apparatus via the content distribution server, the encrypted hash value [E(K_SEC_MBL, H(M))] being obtained by encrypting, using a secret key [K_SEC_MBL] of the first information processing apparatus, a hash value [H(M)] of the content, generated by the content distribution server, and the second information processing apparatus verifies the content received from the content distribution server, using the hash value [H(M)] of the content, obtained by decrypting the encrypted hash value [E(K_SEC_MBL, H(M))] using a public key [K_PUB_MBL] of the first information processing apparatus.

13. The content distribution method according to claim 8, wherein the ticket is obtained by applying a digital signature on data including respective identifiers (IDs) of the first information processing apparatus and the second information processing apparatus, using a secret key of the second information processing apparatus, and the content distribution server verifies the digital signature on the ticket using a public key of the second information processing apparatus.

14. The content distribution method according to claim 8, wherein the content distribution server verifies the digital signature on the ticket by:

(a) verifying the validity of a public-key certificate of the second information processing apparatus by verifying a signature on the public-key certificate (a signature of a certificate authority), (b) obtaining a public key of the second information processing apparatus from the public-key certificate whose validity has been verified, and (c) verifying the signature on the ticket of the second information processing apparatus using the public key of the second information processing apparatus.

15. A first information processing apparatus, comprising:

storage means that stores a ticket carrying a digital signature of a second information processing apparatus that serves as a download destination of content;

control means for generating a content-download request, in which the download destination that is different from the first information processing apparatus itself is specified, including the ticket stored in the storage means; and communication means for sending the content-download request, from the first information processing apparatus, including the ticket carrying the digital signature of the second information processing apparatus to a content distribution server to authenticate that the second information processing apparatus is authorized to receive the content from the content distribution server, the content distribution server configured to verify the digital signature on the ticket, and on condition that the verification has succeeded, the content distribution server configured to determine that the second information processing apparatus is a content-download destination authorized by the first information processing apparatus, and to send the content to the second information processing apparatus.

16. The first information processing apparatus according to claim 15, wherein the control means of the first information processing apparatus generates encrypted key data [E(Ksec, Ksig)] as data to be transmitted to the second information processing apparatus, the encrypted key data [E(Ksec, Ksig)] being obtained by encrypting, using a homenet-area shared secret key [Ksec] that serves as a secret key shared by the first information processing apparatus and the second information processing apparatus, a content-signing key [Ksig] generated by the content distribution server.

17. The first information processing apparatus according to claim 15,
wherein the control means of the first information processing apparatus generates an encrypted hash value [E(Ksec, H(M))] as data to be transmitted to the second information processing apparatus, the encrypted hash value [E(Ksec, H(M))] being obtained by encrypting, using a homenet-area shared secret key [Ksec] that serves as a secret key shared by the first information processing apparatus and the second information processing apparatus, a hash value [H(M)] of the content, generated by the content distribution server.

18. The first information processing apparatus according to claim 15,
wherein the control means of the first information processing apparatus generates encrypted key data [E(K_SEC_MBL, Ksig)] as data to be transmitted to the second information processing apparatus, the encrypted key data [E(K_SEC_MBL, Ksig)] being obtained by encrypting, using a secret key [K_SEC_MBL] of the first information processing apparatus, a content-signing key [Ksig] generated by the content distribution server.

19. The first information processing apparatus according to claim 15,
wherein the control means of the first information processing apparatus generates an encrypted hash value [E(K_SEC_MBL, H(M))] as data to be transmitted to the second information processing apparatus, the encrypted hash value [E(K_SEC_MBL, H(M))] being obtained by encrypting, using a secret key [K_SEC_MBL] of the first information processing apparatus, a hash value [H(M)] of the content, generated by the content distribution sever.

20. A computer storage medium, storing computer executable instructions that cause a computer to implement a method, comprising:

obtaining a ticket carrying a digital signature of a second information processing apparatus that serves as a download destination of content;

generating a content-download-request, in which the download destination that is different from a first information processing apparatus that executes the instructions is specified, including the ticket; and sending, from the first information processing apparatus, the content-download-request including the ticket to a content distribution server to authenticate that the second information processing apparatus is authorized to receive the content from the content distribution server, the content distribution server configured to verify the digital signature on the ticket, and on condition that the verification has succeeded, the content distribution server configured to determine that the second information processing apparatus is a content-download destination authorized by the first information processing apparatus, and to send the content to the second information processing apparatus.

21. A computer storage medium, storing computer executable instructions that cause a computer to implement a method of sending content, said method comprising:

receiving by a content distribution server, from a first information processing apparatus, a content-download-request process in which a second information processing apparatus is specified as a download destination that is different from the first information processing apparatus itself, and a ticket carrying a digital signature of the second information processing apparatus;

verifying, by the content distribution server, the digital signature included in the ticket carrying the digital signature of the second information processing apparatus serving as the download destination, the ticket being included in the content-download request to authenticate that the second information processing apparatus is authorized to receive the content from the content distribution server; and sending, by the content distribution server, content to the second information processing apparatus on condition that the verification has succeeded.

* * * * *